United States Patent
Nakanishi et al.

(10) Patent No.: US 12,147,710 B2
(45) Date of Patent: Nov. 19, 2024

(54) MEMORY SYSTEM AND BLOCK MANAGEMENT METHOD FOR REDUCING A LOAD OF MANAGING BLOCK MANAGEMENT INFORMATION

(71) Applicant: Kioxia Corporation, Tokyo (JP)

(72) Inventors: Yu Nakanishi, Yokohama Kanagawa (JP); Kazuhiro Hiwada, Kamakura Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 18/177,370

(22) Filed: Mar. 2, 2023

(65) Prior Publication Data

US 2024/0086111 A1    Mar. 14, 2024

(30) Foreign Application Priority Data

Sep. 9, 2022    (JP) .................... 2022-143752

(51) Int. Cl.
*G06F 3/06*      (2006.01)
(52) U.S. Cl.
CPC .......... *G06F 3/0659* (2013.01); *G06F 3/0619* (2013.01); *G06F 3/0652* (2013.01); *G06F 3/0679* (2013.01)
(58) Field of Classification Search
CPC .... G06F 3/0619; G06F 3/0652; G06F 3/0659; G06F 3/0679; G06F 3/061; G06F 3/064
See application file for complete search history.

(56) References Cited

U.S. PATENT DOCUMENTS

| | | | | |
|---|---|---|---|---|
| 2007/0083697 | A1* | 4/2007 | Birrell .................. | G06F 12/0246 711/170 |
| 2008/0313505 | A1* | 12/2008 | Lee ..................... | G06F 12/0246 714/E11.004 |
| 2010/0070735 | A1* | 3/2010 | Chen .................... | G06F 3/0679 711/E12.001 |
| 2012/0191900 | A1 | 7/2012 | Kunimatsu et al. | |
| 2014/0157083 | A1 | 6/2014 | Shalvi et al. | |
| 2014/0281801 | A1 | 9/2014 | Meir et al. | |
| 2022/0405007 | A1* | 12/2022 | Park .................... | G06F 11/1441 |

FOREIGN PATENT DOCUMENTS

| | | |
|---|---|---|
| JP | 2011-186553 A | 9/2011 |
| JP | 2016-510928 A | 4/2016 |

* cited by examiner

*Primary Examiner* — Larry T Mackall
(74) *Attorney, Agent, or Firm* — Foley & Lardner LLP

(57) ABSTRACT

The memory system includes a non-volatile memory and a controller. The non-volatile memory includes a plurality of blocks each including a plurality of pages. The controller is configured to sequentially write data from a first page of the plurality of pages when data is written on the plurality of pages. The controller records management information relating to the plurality of blocks in the first page of each of the plurality of blocks.

18 Claims, 20 Drawing Sheets

MEMORY SYSTEM AND BLOCK MANAGEMENT METHOD FOR REDUCING A LOAD OF MANAGING BLOCK MANAGEMENT INFORMATION

CROSS-REFERENCE TO RELATED APPLICATION(S)

This application is based upon and claims the benefit of priority from Japanese Patent Application No. 2022-143752, filed Sep. 9, 2022, the entire contents of which are incorporated herein by reference.

FIELD

Embodiments described herein relate generally to a memory system and a block management method.

BACKGROUND

A NAND type flash memory (NAND memory) is a non-volatile memory in which data cannot be overwritten in a region where data is previously written. When a controller that controls the NAND memory updates data stored in a page of a block, the controller invalidates the data stored in the page before updating, and writes the data after updating the data to a page of another block or another page of the block.

Therefore, the controller periodically or adaptively performs a process called garbage collection or compaction to reuse the page whose data is invalidated. The garbage collection is an operation of generating (N-M) free blocks by moving valid data remaining in N the blocks to M blocks (M<N). The controller erases the data of the N collected source blocks, for example, at a timing when each block is selected as a subsequent write target.

In addition, a block of the NAND memory has a limit on a data erasable frequency. Therefore, the controller performs an operation called wear leveling so that a data erase frequency is uniform as much as possible in all blocks in the NAND.

The controller uses block management information to manage a block erase frequency to properly perform the garbage collection and the wear leveling. The controller prevents disappearance of the block management information by recording the block management information in a specific block. In this case, writing data in the specific block is an operation called system write, which does not relate to writing or reading data requested by a host. The system write is a so-called overhead, and there is a possibility that the system write may cause degraded response performance to the host. Therefore, in managing the block management information, it is preferable to reduce at least a load.

DETAILED DESCRIPTION

Embodiments provide a memory system and a block management method which can reduce a load of managing block management information in a NAND memory.

In general, according to at least one embodiment, the memory system includes a non-volatile memory and a controller. The non-volatile memory includes a plurality of blocks each including a plurality of pages. The controller is configured to sequentially write data from a first page when writing the data in the plurality of pages. The controller records management information relating to the plurality of blocks in the first page of each of the plurality of blocks.

Hereinafter, embodiments will be described with reference to the drawings.

First Embodiment

First, a first embodiment will be described.

Figure 1:
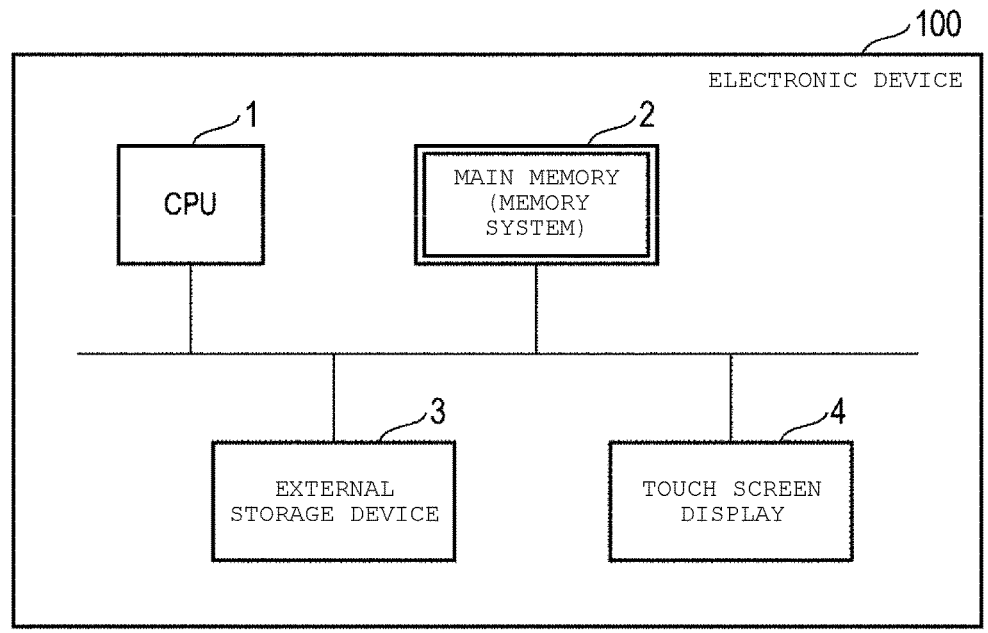
FIG. 1 is a diagram showing an application example of a memory system according to a first embodiment.

FIG. 1 is a diagram showing an application example of a memory system 2 of the first embodiment. Here, it is assumed that the memory system 2 is applied as a main memory of an electronic device 100. As the electronic device 100, various devices such as a tablet personal computer (PC) and a smartphone may be used. Here, it is assumed that the electronic device 100 is implemented by the tablet PC.

In addition, as the main memory of the electronic device 100, a volatile storage device such as a dynamic ram (DRAM (Random Access Memory)) is normally used. Here, for cost reduction it is assumed that the memory system 2 is implemented by a non-volatile storage device equipped with a NAND memory. That is, a condition is assumed in which the memory system 2 is used as a volatile storage device in the electronic device 100 while the memory system 2 is a non-volatile storage device.

The electronic device 100 has a CPU 1, a main memory (memory system) 2, an external storage device 3, and a touch screen display 4.

The CPU 1 executes various programs installed in the external storage device 3 by loading the programs into the main memory 2. In various programs, an operation screen is displayed on the touch screen display 4, various processes are executed in accordance with a touch operation on the operation screen, and a result thereof is displayed on the touch screen display 4.

The main memory (memory system) 2 temporarily stores various programs and input/output data of various programs. The external storage device 3 permanently stores various programs and input/output data of various programs. The external storage device 3 is a hard disk drive (HDD) or a solid state drive (SSD).

For example, the touch screen display 4 is a device for the electronic device 100 to provide a graphical user interface (GUI), in which a liquid crystal panel and a touch panel are superimposed.

In the electronic device 100 configured as described above, the memory system 2 of the first embodiment is used as the volatile storage device while the memory system 2 is the non-volatile storage device equipped with the NAND memory as described above. When the memory system 2 is used as the volatile storage device which does not need to reproduce a storage state of user data stored when a power source is previously turned off when the power source is turned on, as system write in the memory system 2 which is the non-volatile storage device equipped with the NAND memory, writing for recording a data erase frequency in each block is dominantly used. Therefore, the memory system 2 of the first embodiment includes a mechanism capable of reducing a load of managing the data erase frequency in each block which is one of the block management information in the NAND memory. Hereinafter, this point will be described in detail. The mechanism that reduces the load of managing the data erase frequency in each block of the NAND memory, which will be described below, is not limited to a case where the memory system 2 is used as the volatile storage device, and is also effectively applicable to a case where the memory system 2 is used as the non-volatile storage device.

Figure 2:
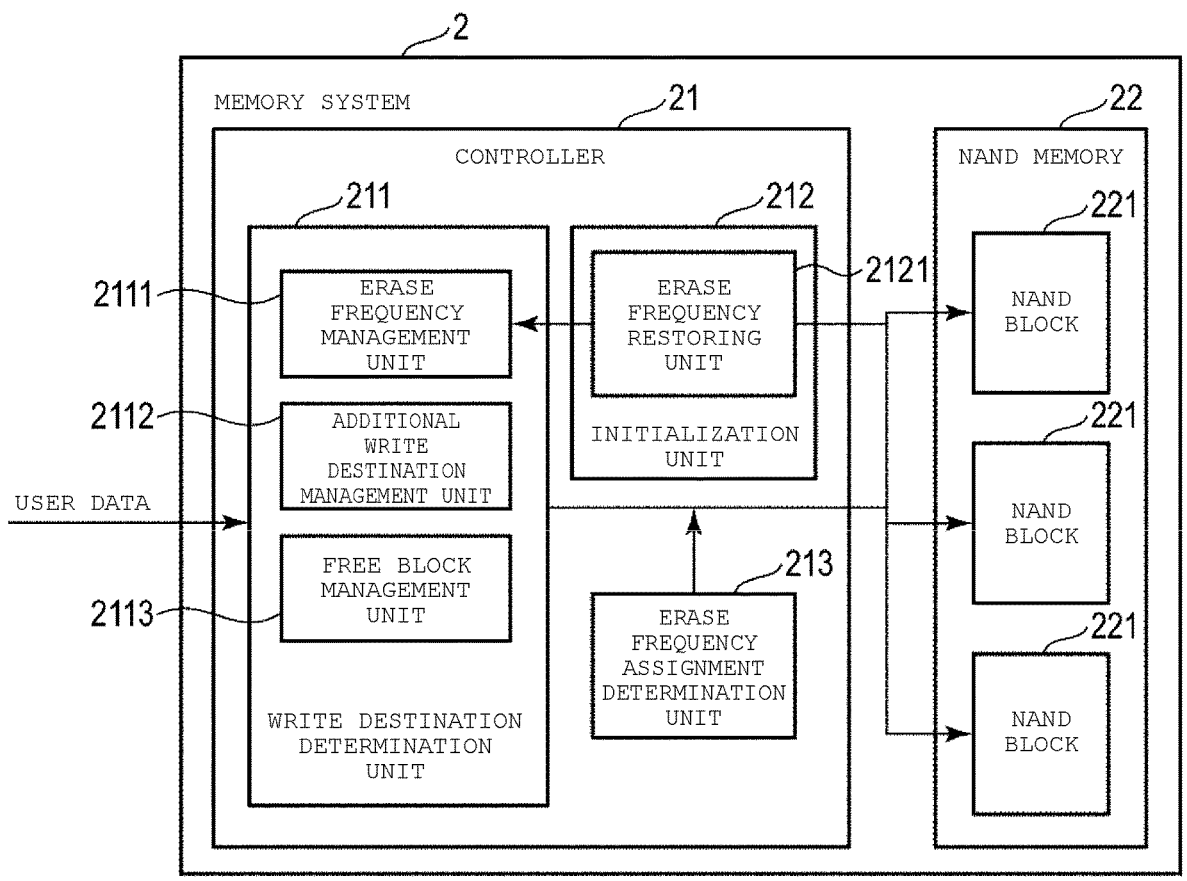
FIG. 2 is a diagram showing a configuration example of the memory system according to the first embodiment.

FIG. 2 is a diagram showing a configuration example of the memory system 2 of the first embodiment. As shown in FIG. 2, the memory system 2 has a controller 21 and a NAND memory 22.

The controller 21 controls the NAND memory 22. The controller 21 writes data in the NAND memory 22 or reads data from the NAND memory in response to a request from the CPU 1. In FIG. 2, in order to distinguish data (system data) including the data erase frequency in each block of the NAND memory 22, the data being written in the NAND memory 22 by performing the system write, write data in the NAND memory 22 which is received from the CPU 1 by the controller 21 will be referred to as user data. In some cases, the system data may be referred to as metadata.

The NAND memory 22 has a plurality of NAND blocks 221. Each NAND block 221 has a plurality of pages. A page number is assigned to each of the plurality of pages in ascending order. Specifically, a smallest page number is assigned to a first page, and page numbers incremented one by one from the smallest page number are assigned in order toward a last page. Data is sequentially written (additionally written) in the NAND block 221 from the first page to the last page. In addition, a block number is assigned to each of the plurality of NAND blocks 221.

The controller 21 has a write destination determination unit 211, an initialization unit 212, and an erase frequency assignment determination unit 213. For example, the controller 21 is configured as a system on a chip (SoC), and each unit in the controller 21 is provided in such a manner that a processor (not shown) in the controller 21 executes a program called firmware. Alternatively, each unit in the controller 21 may be implemented by hardware such as an electric circuit. Hereinafter, the data erase frequency in the NAND block 221 may also be referred to as an erase frequency. That is, erasing data in the NAND block 221 may also be referred to as erase.

The write destination determination unit 211 determines the NAND block 221 serving as a user data write destination, from the plurality of NAND blocks 221 of the NAND memory 22. The write destination determination unit 211 manages pages serving as the write destination in the determined NAND block 221. The write destination determination unit 211 has an erase frequency management unit 2111, a write destination management unit 2112, and a free block management unit 2113.

The erase frequency management unit 2111 manages the erase frequency of each NAND block 221 without consuming a specific NAND block 221 as a block (system block) for recording the erase frequency of each NAND block 221. Specifically, the erase frequency management unit 2111 manages the erase frequency of each NAND block 221 by using a part (for example, a redundant region) of the first page and the last page of the NAND block 221. A method for managing the erase frequency in the erase frequency management unit 2111 will be described in detail later.

The write destination management unit 2112 monitors the number of remaining pages of the NAND block 221 which is a current write destination (write destination) of the user data. For example, when the number of remaining pages is equal to or smaller than a threshold value, the write destination management unit 2112 selects the NAND block 221 serving as a next write destination.

As a free block, the free block management unit 2113 manages the NAND block 221 in an unused state. The write destination management unit 2112 selects the NAND block 221 serving as the next write destination from the NAND blocks 221 managed as the free blocks by the free block management unit 2113. When the controller 21 selects the NAND block 221 serving as the next write destination, the controller 21 erases data of the NAND block 221. Since the data is erased, all pages in the NAND block 221 are shifted from a data-written state to a data-unwritten state, that is, a data-writable state. When the write destination management unit 2112 selects the NAND block 221 serving as the next write destination from the NAND blocks 221 managed as the free blocks by the free block management unit 2113, it is preferable that the write destination management unit 2112 selects the NAND block 221 having the smallest erase frequency.

When power supply to the memory system 2 starts, the initialization unit 212 performs an operation of returning system data stored in the NAND memory 22 to an initial state. There is a possibility that the system data may be inconsistent when the power supply unexpectedly cut off while immediately previous cut-off of the power supply does not follow a normal procedure, that is, when the power supply is improperly cut off. The initialization unit 212 has an erase frequency restoring unit 2121. The erase frequency restoring unit 2121 restores the erase frequency of each NAND block 221 in cooperation with the erase frequency management unit 2111 of the write destination determination unit 211. A method for restoring the erase frequency will be described later.

The erase frequency assignment determination unit 213 determines whether it is a timing for writing the erase frequency of each NAND block 221 in the NAND memory 22. As described above, in the memory system 2 of the first embodiment, a part (for example, a redundant region) of the first page and the last page of the NAND block 221 is used to manage the erase frequency of each NAND block 221. Although a method for managing the erase frequency will be described later, specifically, the erase frequency assignment determination unit 213 determines whether the page serving as a write target in the NAND block 221 is the first page or the last page.

Figure 3:
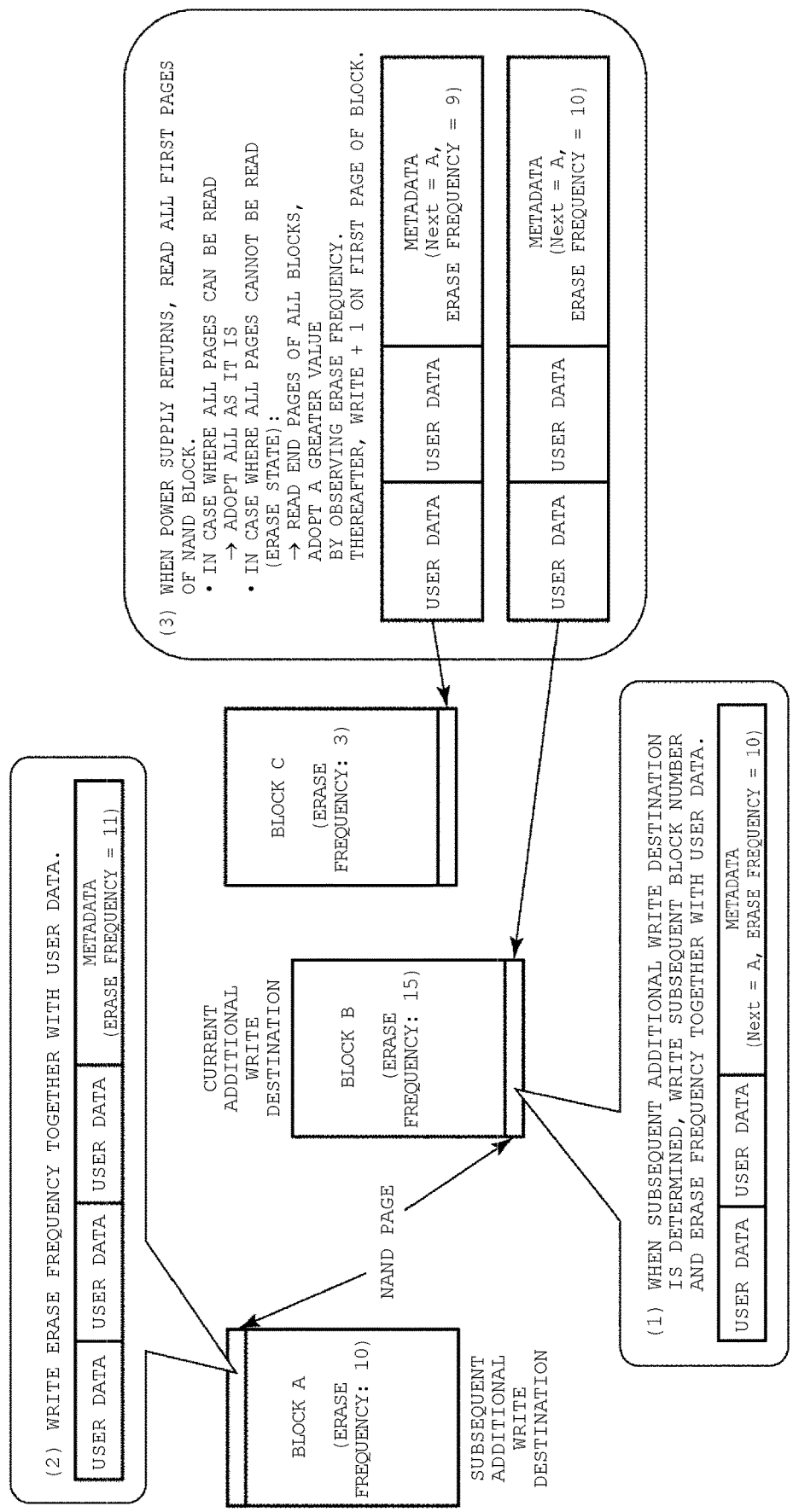
FIG. 3 is a diagram illustrating a method for managing an erase frequency and a method for restoring the erase frequency which are executed by the memory system of the first embodiment.

Next, referring to FIG. 3, a method for managing the erase frequency and a method for restoring the erase frequency after the power supply is cut off which are executed in the memory system 2 of the first embodiment configured as described above will be described.

Here, first, it is assumed that a block B is a current write destination (write destination) of the user data. In addition, the user data is progressively written in the block B, and the remaining page of the block B is only the last page. Therefore, it is assumed that the write destination management unit 2112 selects a block A as a next write destination. The block A is selected from the blocks managed as the free blocks by the free block management unit 2113.

When the write target of the user data in the block B is the last page, the erase frequency assignment determination unit 213 detects that the write target is the last page. In this case, as the metadata, the erase frequency management unit 2111 writes a block number of the block A serving as the next write destination and the erase frequency of the block A at a time point thereof, on the last page of the block B together with the user data (1). The erase frequency of the block A is stored in the first page of the block A as the metadata. That is, the erase frequency management unit 2111 reads the erase frequency of the block A stored as the metadata in the first page of the block A, and writes the erase frequency on the last page of the block B as the metadata. Here, it is assumed that the erase frequency of the block A at that time point is 10.

When the metadata is completely written on the last page of the block B, the block A is erased. After the block A is completely erased, when the user data is written on the first page of the block A, the erase frequency assignment determination unit 213 detects that the write target of the user data is the first page. In this case, the erase frequency management unit 2111 increments the erase frequency by one, which is read from the first page of the block A when the block A is selected as the next write destination, and writes the erase frequency of the block A after the increment on the first page of the block A together with the user data, as the metadata (2). At this time, 11 is written on the first page of the block A as the erase frequency of the block A. That is, the erase frequency written as the metadata on the last page of the block B is written as the metadata on the first page when the block A is previously selected and erased as the next write destination.

For example, in the memory system 2 of the first embodiment in which a method for managing the erase frequency is executed as described above, compared to a case where the erase frequency of each NAND block 221 is recorded by using a specific block as the system block, the erase frequency of each NAND block 221 is recorded in the first page and the last page of the NAND block 221 together with the user data. Therefore, the system write which is overhead can be significantly reduced. Therefore, the memory system 2 of the first embodiment can improve response performance to a host. In addition, the memory system 2 of the first embodiment can eliminate a need to allocate the system block for storing the erase frequency of each NAND block 221.

Next, the following case is assumed. The power supply unexpectedly cut off while the cut-off of the power supply to the memory system 2 does not follow a normal procedure is improperly cut off, and thereafter, the power supply returns. On this assumption, a method for restoring the erase frequency which is executed by the memory system 2 of the first embodiment will be described.

As a case where the erase frequency is inconsistent in the NAND block 221 recorded in the first page and the last page of the NAND block 221, the following case is conceivable. The power supply is improperly cut off before the latest number of times of erasing is written on the first page of the NAND block 221 after a certain NAND block 221 is erased.

The erase frequency restoring unit 2121 reads the first page for all of the NAND blocks 221 of the NAND memory 22. For the NAND block 221 whose first page is called, the erase frequency restoring unit 2121 adopts the erase frequency stored as the metadata in the first page as it is. On the other hand, for the NAND block 221 whose first page cannot be called, the power supply is improperly cut off before the latest erase frequency is written on the first page after erase. Therefore, it is determined that the NAND block 221 is a block in which the latest number of times of erasing is lost. In this case, the erase frequency restoring unit 2121 restores the lost latest number of times of erasing in accordance with the following procedure. Here, a case is assumed where the first page of the block A can not be read.

As described above, when the block A is selected and erased as the next write destination, the erase frequency of the block A at that time point is written as the metadata on the last page of the current write destination block. One or more blocks in which the erase frequency of the block A is recorded in the last page may exist in the NAND memory 22. For example, when a block C is the current write destination, the block A is selected as the next write destination. Thereafter, when the block A is selected again as the next write destination when the block B is the current write destination without erasing the block C, the erase frequency of the block A is recorded at two locations on the last page of the block C and the last page of the block B. In this case, the erase frequency recorded in the last page of the block B is incremented by one from the erase frequency recorded in the last page of the block C. In FIG. 3, 10 is recorded in the last page of the block B as the erase frequency of the block A, and 9 is recorded in the last page of the block C as the erase frequency of the block A.

When the first page of the block A can not be read, the erase frequency restoring unit 2121 reads the last pages of all blocks other than the block A in the NAND memory 22, and retrieves the erase frequency of the block A. When only one is retrieved, the erase frequency restoring unit 2121 increments the erase frequency by one, and writes the incremented result on the first page of the block A. When two or more are retrieved, the erase frequency restoring unit 2121 adopts the erase frequency having the greatest value from retrieved results. The erase frequency restoring unit 2121 increments the adopted number of times of erasing having the greatest value by one, and writes the incremented result on the first page of the block A (3). That is, 11 which is the erase frequency of the block A is written on the first page of the block A.

In this manner, the memory system 2 of the first embodiment can cope with a situation in which the power supply to the memory system 2 is improperly cut off even without performing the system write for writing the erase frequency of each NAND block 221 in the system block.

Figure 4:
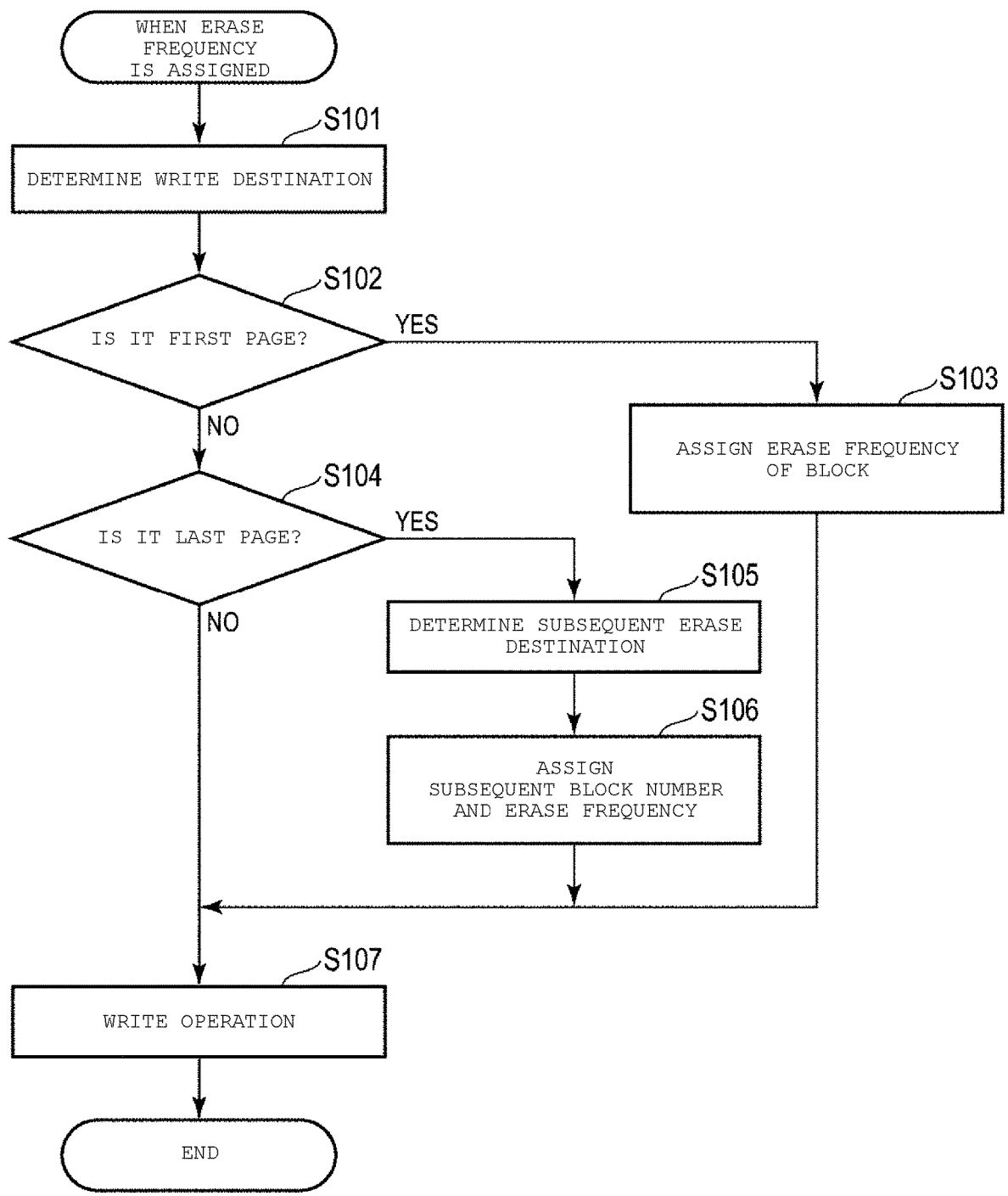
FIG. 4 is a flowchart showing an operation flow when the erase frequency is assigned in the memory system of the first embodiment.

FIG. 4 is a flowchart showing an operation flow when the erase frequency is assigned in the memory system 2 of the first embodiment.

The erase frequency assignment determination unit 213 determines which page in the NAND block 221 serving as the current additional write destination is the write destination (S101). When it is determined that the write destination is the first page (S102: YES), the erase frequency management unit 2111 assigns the erase frequency of the block to the write data (S103). The write destination determination unit 211 performs a write operation on the first page (S107).

In addition, when it is determined that the write destination is the last page (S102: NO, S104: YES), the write destination management unit 2112 determines the next write destination, that is, the subsequent erase destination (S105). The erase frequency management unit 2111 assigns the determined subsequent block number and the erase frequency to the write data (S106). The write destination determination unit 211 performs a write operation on the last page (S107).

In addition, when it is determined that the write destination is neither the first page nor the last page (S104: NO), the write destination determination unit 211 performs a write operation on a page other than the first page and the last page of the write data to which the block number and the erase frequency are not assigned (S107).

Figure 5:
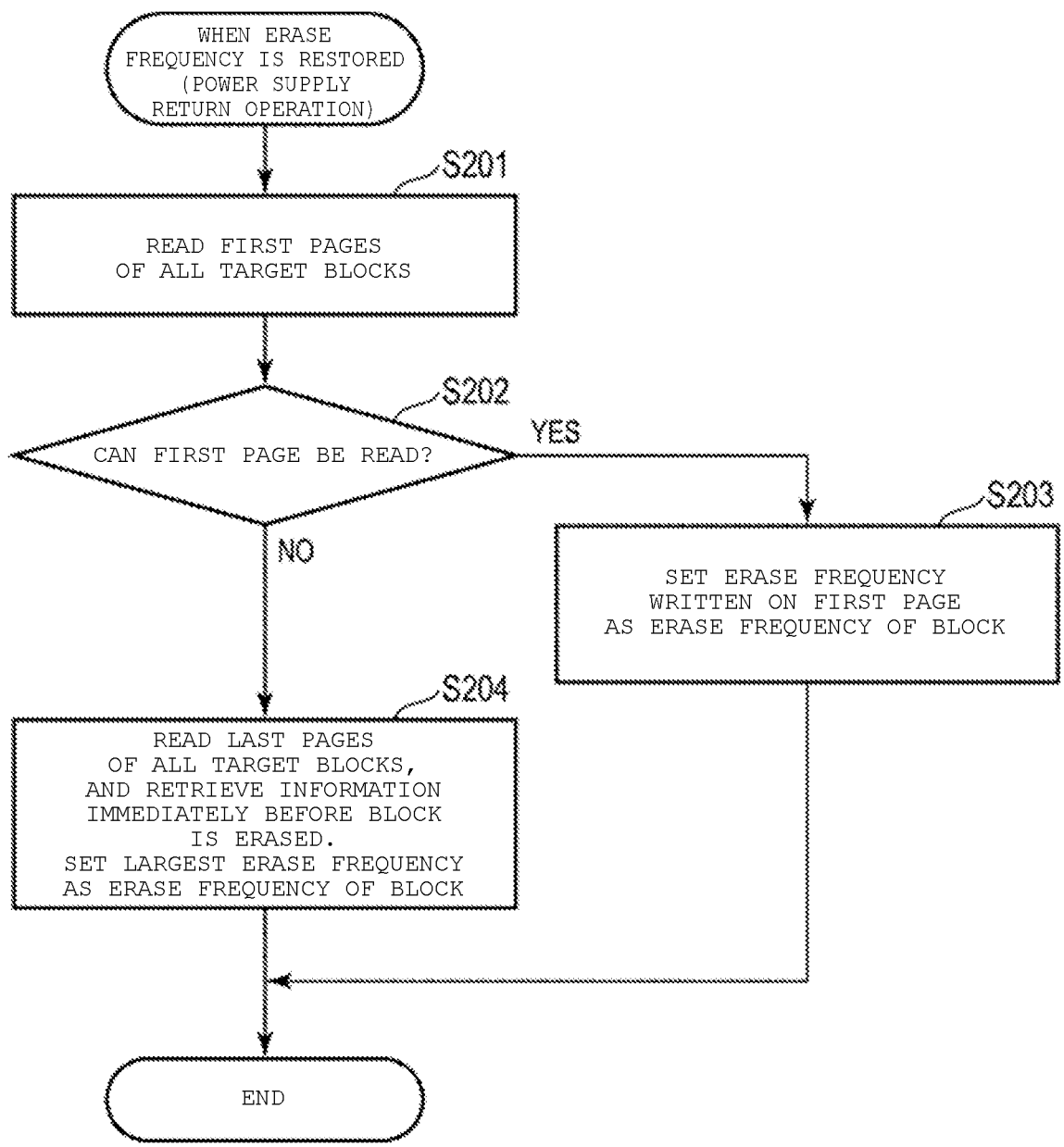
FIG. 5 is a flowchart showing an operation flow when the erase frequency is restored in the memory system according to the first embodiment.

FIG. 5 is a flowchart showing an operation flow when the erase frequency is restored in the memory system 2 of the first embodiment.

The erase frequency restoring unit 2121 reads the first page of all target blocks (S201). When the first page of the block can be read (For example, when the first page is not an erased page) (S202: YES), the erase frequency restoring unit 2121 sets the erase frequency written on the first page as the erase frequency of the block (S203).

On the other hand, when the first page of the block can not be read (For example, when the first page is an erased page) (S202: NO), the erase frequency restoring unit 2121 reads the last page of all target blocks, and retrieves information immediately before the page is erased. The erase frequency restoring unit 2121 sets the largest number of times of erasing as the erase frequency of the block (S204).

As described above, the memory system 2 of the first embodiment can reduce a load of managing the data erase frequency in each block which is one management information of the block in the NAND memory.

Second Embodiment

Next, a second embodiment will be described.

The memory system 2 of the first embodiment can eliminate a need for the system write for writing the erase frequency of each block in the system block. On the other hand, the memory system 2 needs to read the last pages of all blocks in restoring the erase frequency of the block whose first page can not be read.

The memory system 2 of the second embodiment performs the system write for writing the erase frequency of each block in the system block concurrently when the erase frequency is written on the first page of each block. However, a frequency thereof is reduced. In this manner, while the memory system 2 of the second embodiment can quickly restore the erase frequency of the block whose first page can not be read, from the system data of the system block, the memory system 2 improves response performance by reducing a load of the system write which is overhead.

Figure 6:
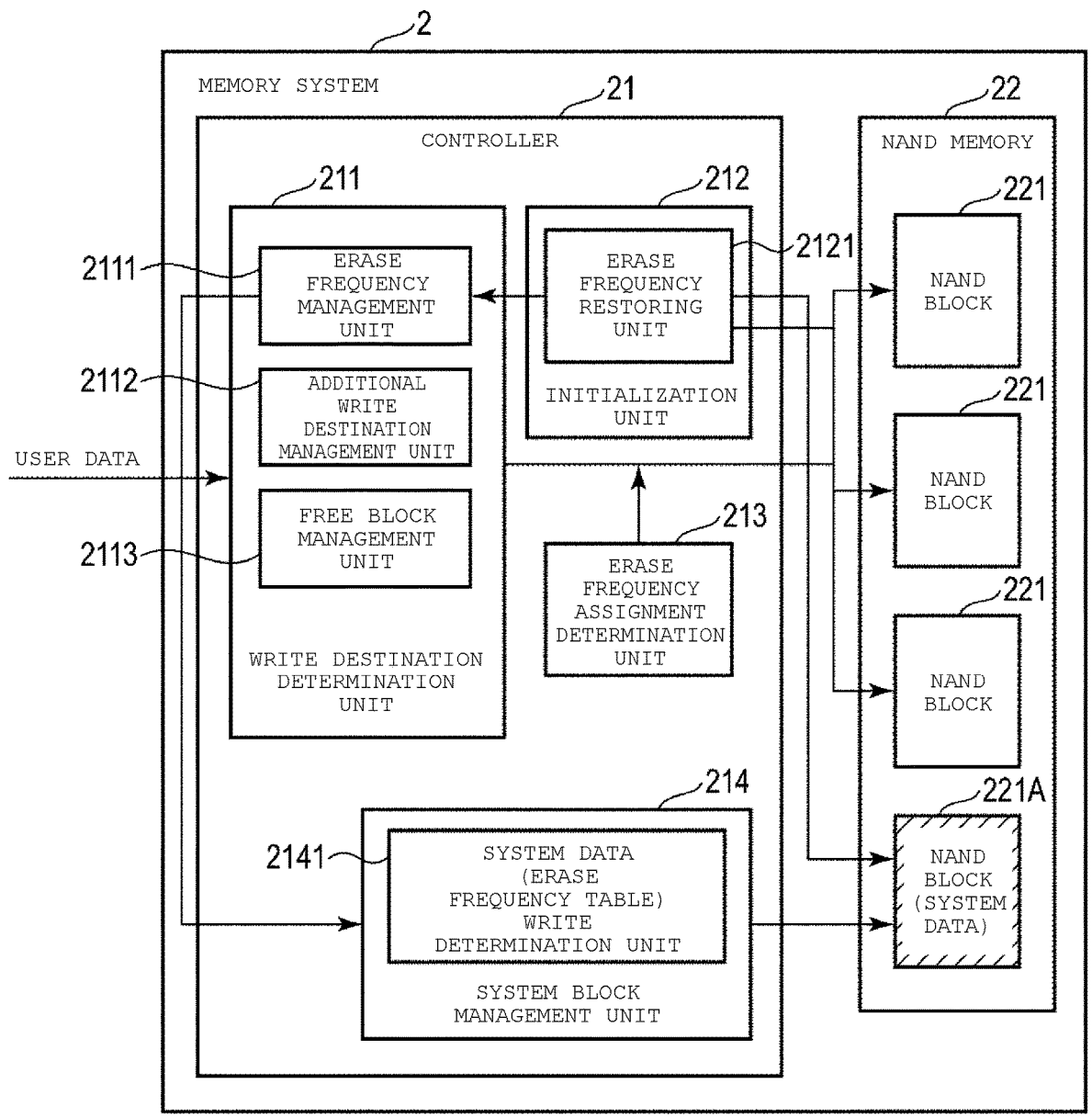
FIG. 6 is a diagram showing a configuration example of a memory system according to a second embodiment.

FIG. 6 is a diagram showing a configuration example of the memory system 2 of the second embodiment. Compared to the memory system 2 of the first embodiment (refer to FIG. 2), the controller 21 of the memory system 2 of the second embodiment further has a system block management unit 214.

The system block management unit 214 manages a specific NAND block 221A in the NAND memory 22 as a system block for storing the system data. The NAND block 221A for the system block is selected in any desired way from a plurality of NAND blocks 221 in the NAND memory 22, and only a usage of the NAND block 221A is different from a usage of the NAND block 221 for storing the user data. For example, the NAND block 221 used to store the user data at a certain time point may be used to store the system data at a time point later. Conversely, the NAND block 221A used to store the system data at a certain time point may be used to store the user data at a time point later. That is, the NAND block 221A in FIG. 6 is also a management target of the erase frequency.

Figure 7:
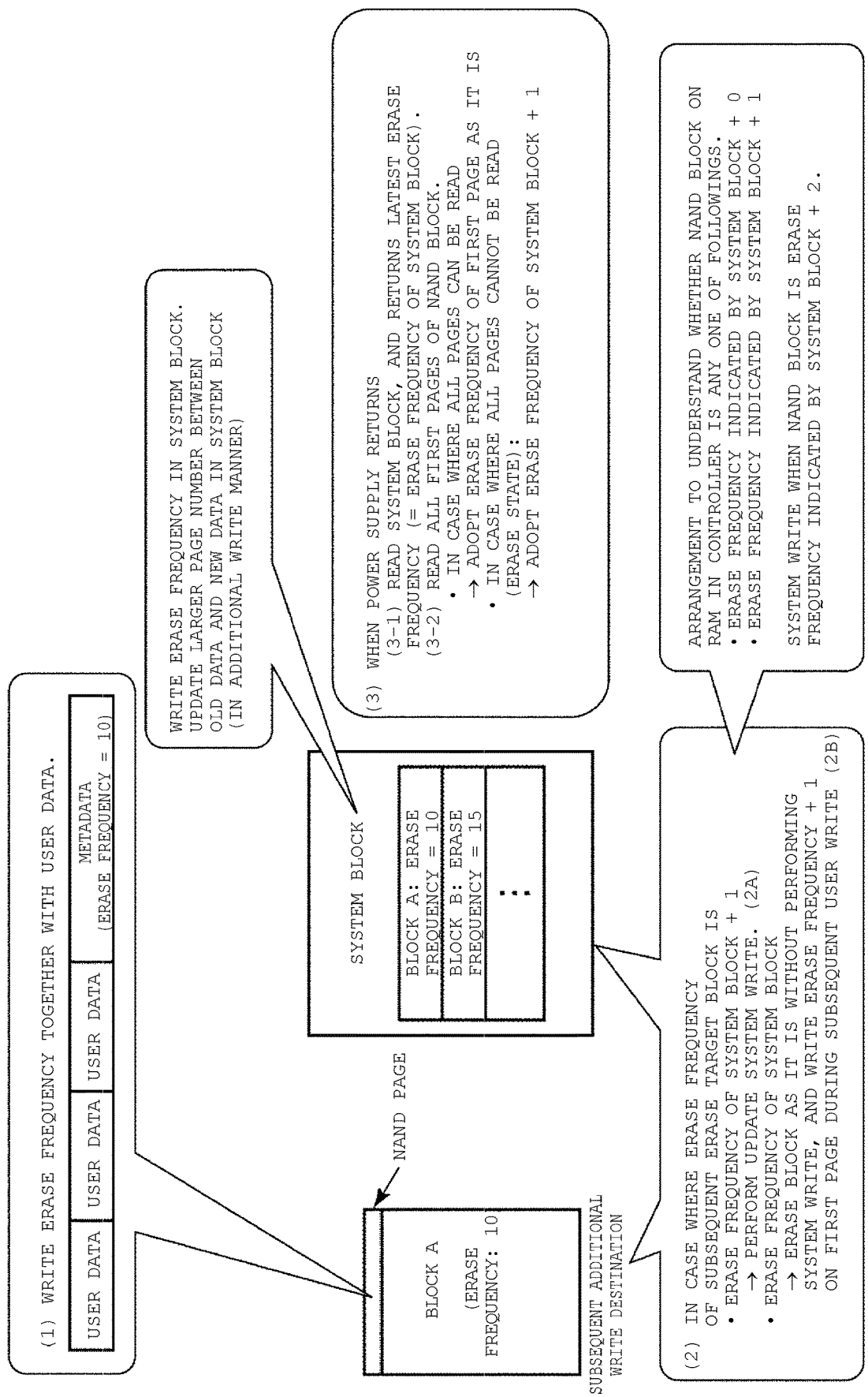
FIG. 7 is a diagram illustrating a method for managing an erase frequency and a method for restoring the erase frequency which are executed by the memory system of the second embodiment.

The system block management unit 214 has a system data (erase frequency table) write determination unit 2141. Whenever a certain block is erased, a system data write determination unit 2141 determines whether to perform the system write to reduce a system write frequency instead of writing the block erase frequency in the system block to increment the block erase frequency by one. Hereinafter, referring to FIG. 7, a mechanism that reduces a system write frequency relating to the erase frequency of each block in the memory system 2 of the second embodiment will be described.

Here, a case where the block A is selected as the next write destination will be described as an example. In the memory system 2 of the second embodiment, the erase frequency assignment determination unit 213 determines only whether the write target page in the NAND block 221 is the first page. When it is determined that the write target page is the first page, the erase frequency management unit 2111 stores the erase frequency obtained in such a manner that the erase frequency stored in the first page before the block is erased is incremented by one, in the first page after erase (1). At this time, the system data write determination unit 2141 determines whether the erase frequency stored in the first page before the block is erased coincides with the erase frequency of the block stored in the system block. In order to eliminate a need to read the erase frequency from the system block, in cooperation with the erase frequency management unit 2111, the system data write determination unit 2141 stores information for determining whether or not the numbers of times of erasing coincide with each other, in a RAM (not shown) in the controller 21, for example. Specifically, for example, the RAM stores information indicating a state where the erase frequency stored in the first page for each block is equal to the erase frequency stored in the system block or a state where the erase frequency is incremented by one.

When both coincide with each other, the system data write determination unit 2141 determines not to write the system data (erase frequency) in the system block associated with the erase. In response to this determination result, the erase frequency management unit 2111 only stores the erase frequency in the first page after erase (2B). In this case, the erase frequency of the first page after erase is a value obtained by incrementing the erase frequency of the system block by one.

On the other hand, when both do not coincide with each other, the system data write determination unit 2141 determines to write the system data (erase frequency) in the system block associated with the erase. The case where both do not coincide with each other is a case where the erase frequency stored in the first page before erase is a value obtained by incrementing the erase frequency of the system block by one. In response to this determination result, the erase frequency management unit 2111 stores the erase frequency in the first page after erase, and instructs the system block management unit 214 to write the erase frequency in the system block (2A). In this case, the erase frequency of the first page after erase and the erase frequency of the system block coincide with each other.

That is, in the memory system 2 of the second embodiment, when the erase frequency of the first page after erase is a value obtained by incrementing the erase frequency of the system block by two, in order that both values coincide with each other, the erase frequency is written in the system block (system write).

When this system write is performed, if there exists the NAND block 221 whose first page stores a value obtained by incrementing the erase frequency stored in the system block by one, the erase frequency management unit 2111 instructs the system block management unit 214 to update information with the erase frequency of the NAND block 221 stored in the system block. The presence or absence can be determined by referring to information for determining whether the erase frequencies coincide with each other, for example, which is stored in the RAM (not shown) in the controller 21 described above.

For example, in a state where the erase frequency stored in the first page of all NAND blocks 221 in the NAND memory 22 is incremented by one than the erase frequency stored in the system block, when any one of the NAND blocks 221 is erased, the erase frequency of the system block for all NAND blocks 221 is updated by one system write.

In this manner, when wear leveling is properly performed, it is possible to realize that the system write relating to the erase frequency of each block which is overhead may be reduced to 1/(the number of NAND blocks 221) at the maximum.

Next, restoring the erase frequency in the memory system 2 of the second embodiment which manages the erase frequency of each block as described above will be described.

In some cases, the erase frequency of the same block may be stored in a plurality of pages in the system block. In the system block, the write data is sequentially and additionally written from the first page to the last page. Therefore, it is assumed that the latest erase frequency is stored in the page having the greater page number.

The erase frequency restoring unit 2121 reads the erase frequency of each block which is stored in the system block (3-1). In addition, the erase frequency restoring unit 2121 reads the first pages of all NAND blocks 221 (3-2). For the block whose first page is read, the erase frequency restoring unit 2121 adopts the erase frequency stored in the first page as it is. On the other hand, for the block whose first page can not be read, a value obtained by incrementing the erase frequency read from the system block by one is set as the erase frequency of the block, and is written on the first page of the block.

In the memory system 2 of the second embodiment in which the restoring is performed in this way, there is a possibility that an error corresponding to one increment may occur. However, compared to the memory system 2 of the first embodiment, it is unnecessary to read the last pages of all NAND blocks 221, and thus, a time required for the restoring can be significantly shortened. In addition, in the memory system 2 of the second embodiment, it is necessary to perform the system write relating to the erase frequency of each block, and the frequency can be reduced to 1/(the number of NAND blocks 221) at a maximum.

Figure 8:
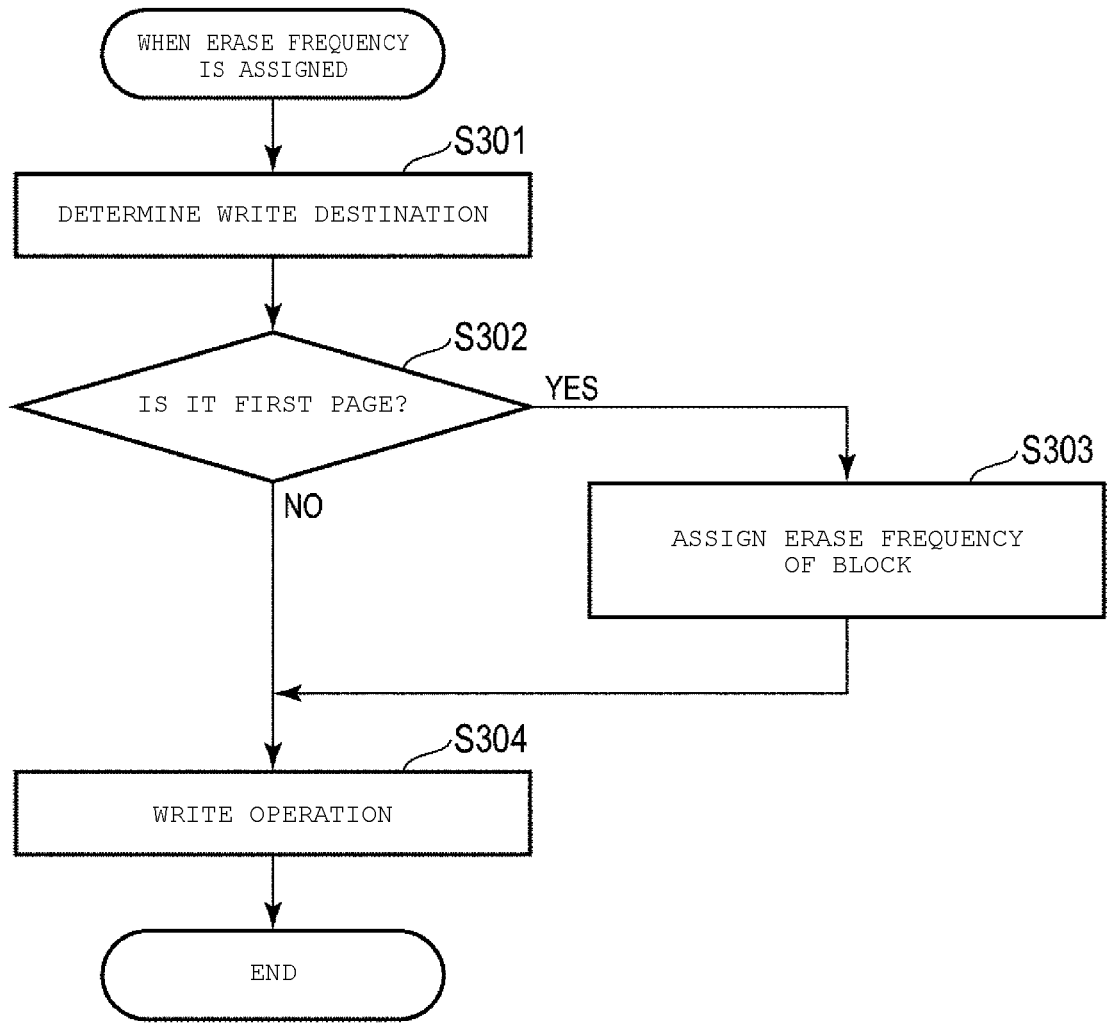
FIG. 8 is a flowchart showing an operation flow when the erase frequency is assigned in the memory system according to the second embodiment.

FIG. 8 is a flowchart showing an operation flow when the erase frequency is assigned in the memory system 2 of the second embodiment.

The erase frequency assignment determination unit 213 determines which page in the NAND block 221 serving as the current write destination is the write destination (S301). When it is determined that the write destination is the first page (S302: YES), the erase frequency management unit 2111 assigns the erase frequency of the block to the write data (S303). The write destination determination unit 211 performs a write operation on the first page (S304).

On the other hand, when it is determined that the write destination is not the first page (S302: NO), the write destination determination unit 211 performs a write operation on the page other than the first page of the write data to which the erase frequency is not assigned (S304).

Figure 9:
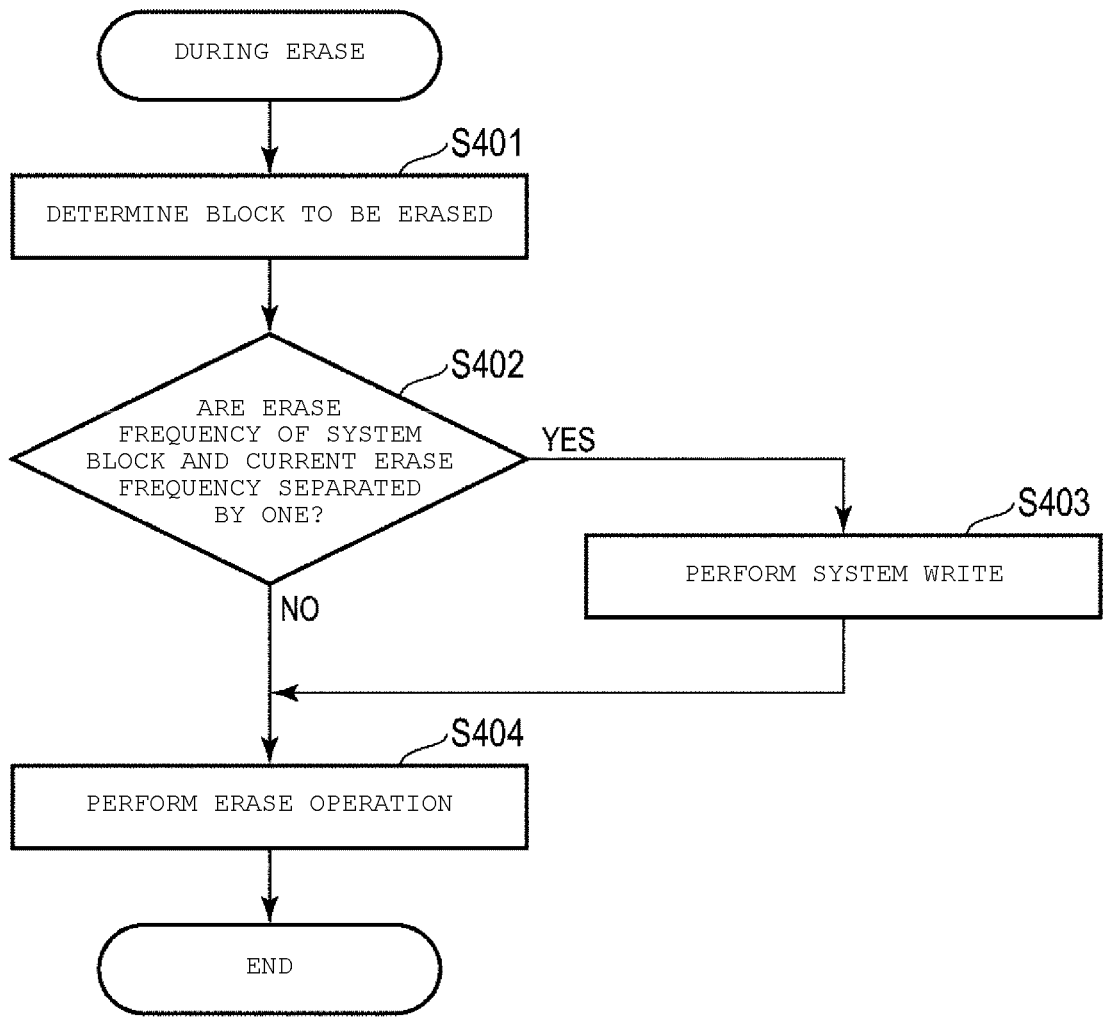
FIG. 9 is a flowchart showing an operation flow during erase in the memory system of the second embodiment.

FIG. 9 is a flowchart showing an operation flow during erase of the memory system 2 of the second embodiment.

The write destination management unit 2112 determines the next write destination, that is, the block to be erased (S401). The system data write determination unit 2141 determines whether the erase frequency of the system block and the erase frequency stored in the first page of the determined block are separated by one (S402). When both the numbers of times of erase are separated by one (S402: YES), the erase frequency management unit 2111 performs the system write via the system block management unit 214 (S403), and the write destination determination unit 211 erases the block (S404).

On the other hand, when both the erase frequencies coincide with each other (S402: NO), S403 is skipped, and the write destination determination unit 211 erases the block (S404).

Figure 10:
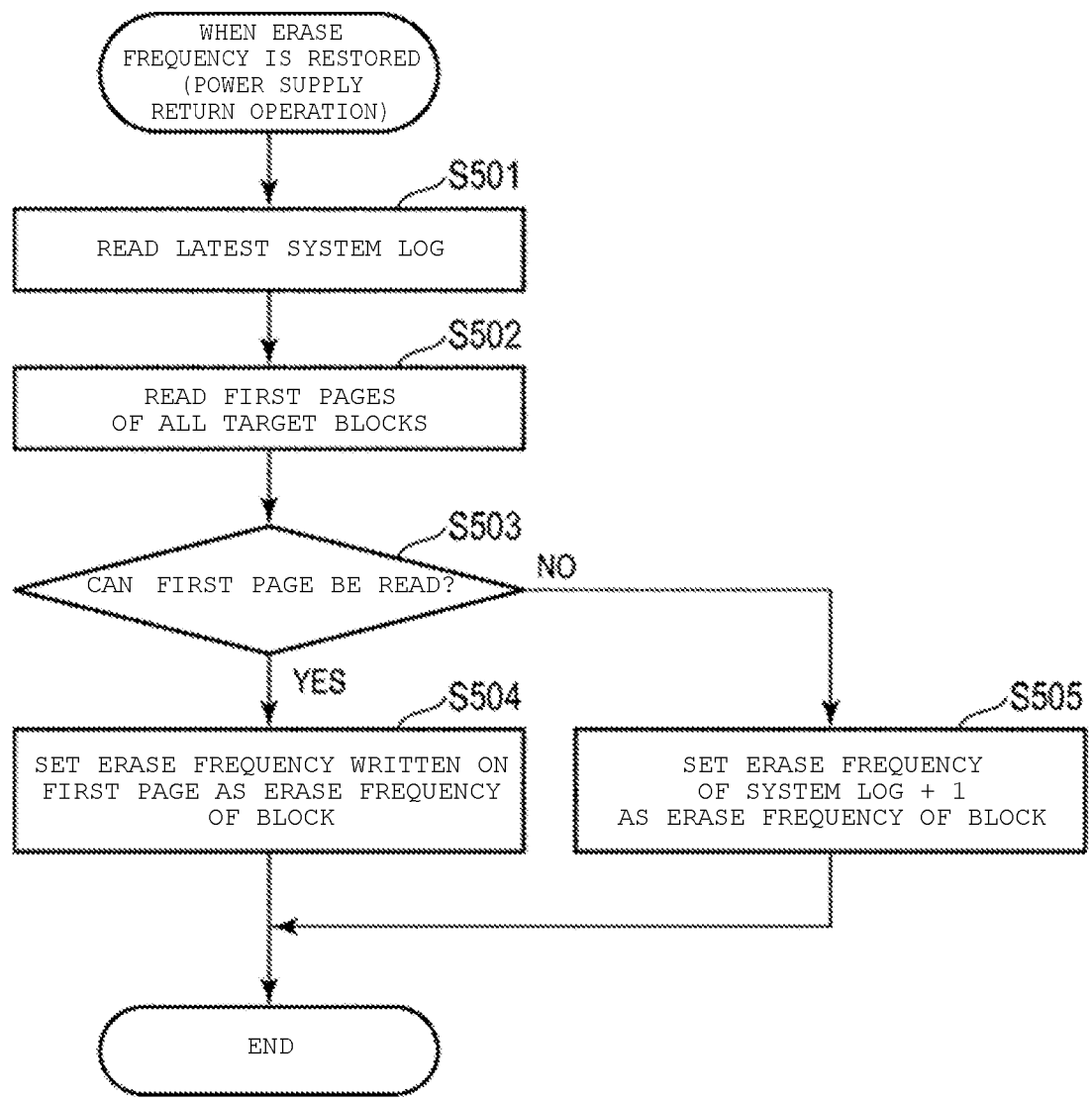
FIG. 10 is a flowchart showing an operation flow when the erase frequency is restored in the memory system according to the second embodiment.

FIG. 10 is a flowchart showing an operation flow when the erase frequency is restored in the memory system 2 of the second embodiment.

The erase frequency restoring unit 2121 reads the system data of the system block including the erase frequency of each block, that is, a system log (S501). In addition, the erase frequency restoring unit 2121 reads the first pages of all target blocks (S502). In a case of the block whose first page can be read (For example, when the first page is not an erased page) (S503: YES), the erase frequency restoring unit 2121 sets the erase frequency written on the first page, as the erase frequency of the block (S504).

On the other hand, when the first page can not be read (For example, the first page is an erased page) (S503: NO), the erase frequency restoring unit 2121 sets a value obtained by incrementing the erase frequency of the system log by one, as the erase frequency of the block (S505).

As described above, the memory system 2 of the second embodiment can also reduce the load of managing the data erase frequency of each block which is one block management information of the NAND memory.

Third Embodiment

Next, a third embodiment will be described.

In the memory system 2 of the second embodiment, while a frequency of the system write for writing the erase frequency of each block in the system block is reduced to be capable of quickly restoring the erase frequency of the block whose first page can not be read, the system write is performed concurrently when the erase frequency is written on the first page of each block. The memory system 2 of the third embodiment further reduces a data amount of the system write for writing the erase frequency of each block in the system block. More specifically, the memory system 2 of the third embodiment converts the erase frequency recorded in the system block into differential information.

Figure 11:
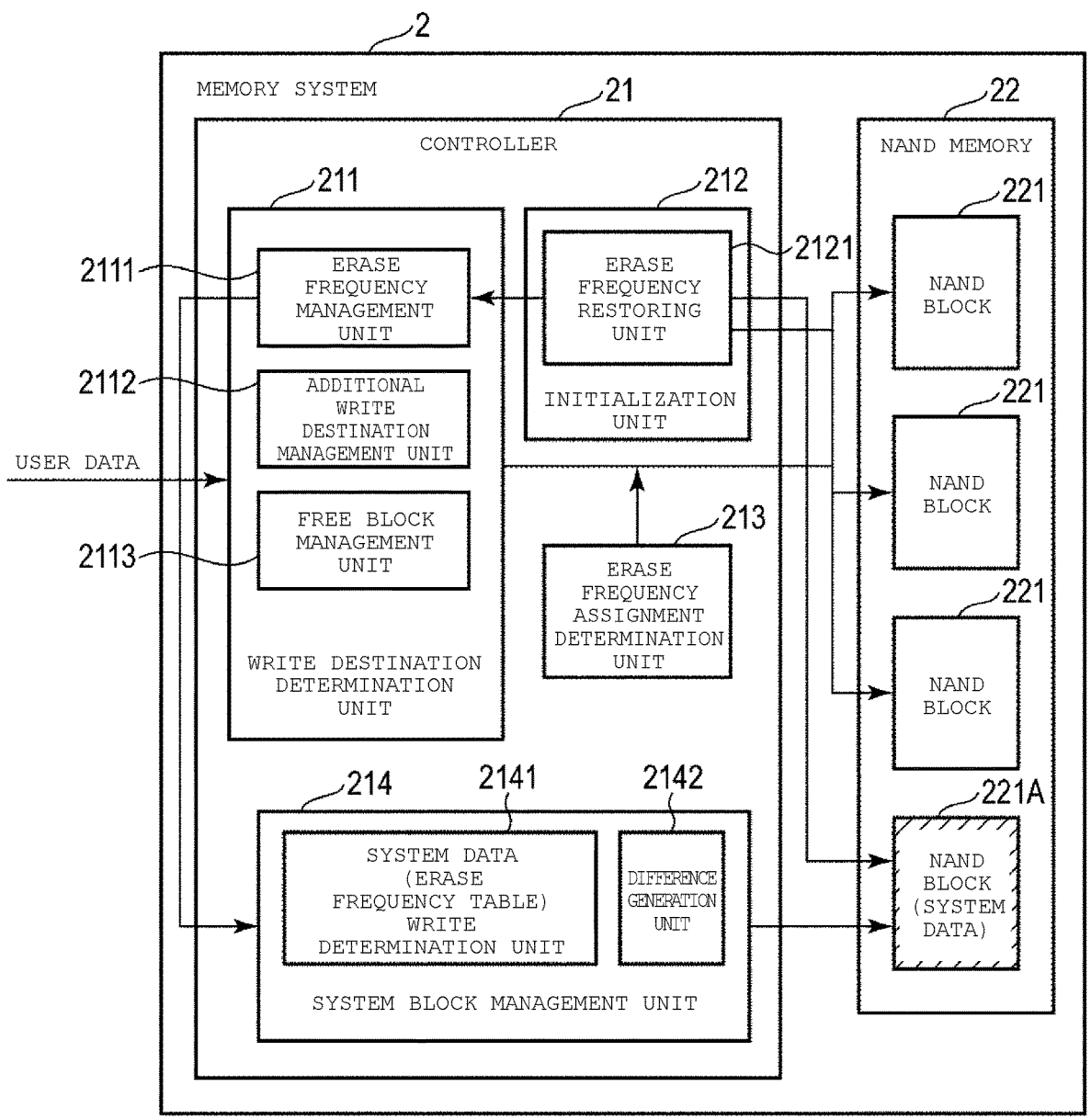
FIG. 11 is a diagram showing a configuration example of a memory system according to a third embodiment.

FIG. 11 is a diagram showing a configuration example of the memory system 2 of the third embodiment. Compared to the memory system 2 (refer to FIG. 6) of the second embodiment, in the memory system 2 of the third embodiment, the system block management unit 214 further has a difference generation unit 2142. Hereinafter, referring to FIG. 12, a mechanism that reduces the data amount of the system write relating to the erase frequency of each block in the memory system 2 of the third embodiment will be described.

The system block management unit 214 in the memory system 2 of the third embodiment records the erase frequency of each NAND block 221 by using a main log and a difference log. Here, it is assumed that the erase frequency of the block A is 10 and the erase frequency of the block B is 15. That is, the first page of the block A stores 10 as the erase frequency, and the first page of the block B stores 15 as the erase frequency. In addition, it is assumed that both the block A and the block B in the main log store the erase frequency which is the same as the erase frequency stored in the first page of each block.

As described in the second embodiment, the system write for writing the erase frequency in the system block is performed when the erase frequency of the first page of each block is a value two times greater than a value of the erase frequency of the system block. Therefore, when the block A is erased for the eleventh time, 11 is written as the erase frequency on the first page of the block A after erase (1). At this timing, the system data write determination unit 2141 determines not to write the erase frequency in the system block.

Thereafter, in any NAND block 221, the block A is erased for the twelfth time, while the erase frequency of the first page does not have a value greater by two than a value of the erase frequency of the system block. In this case, the system data write determination unit 2141 determines to write the erase frequency in the system block.

At this time, in the memory system 2 of the third embodiment, the difference generation unit 2142 generates difference data indicating the NAND block 221 in which the first page stores a value greater by one than a value of the erase frequency stored in the system block. The difference data may be a bitmap in which the NAND block 221 in the NAND memory 22 is mapped, each bit indicating whether erasing is performed, or may be a block number of the NAND block 221 in which erasing is performed. The system block management unit 214 writes the difference data generated by the difference generation unit 2142 in the difference log.

Figure 12:
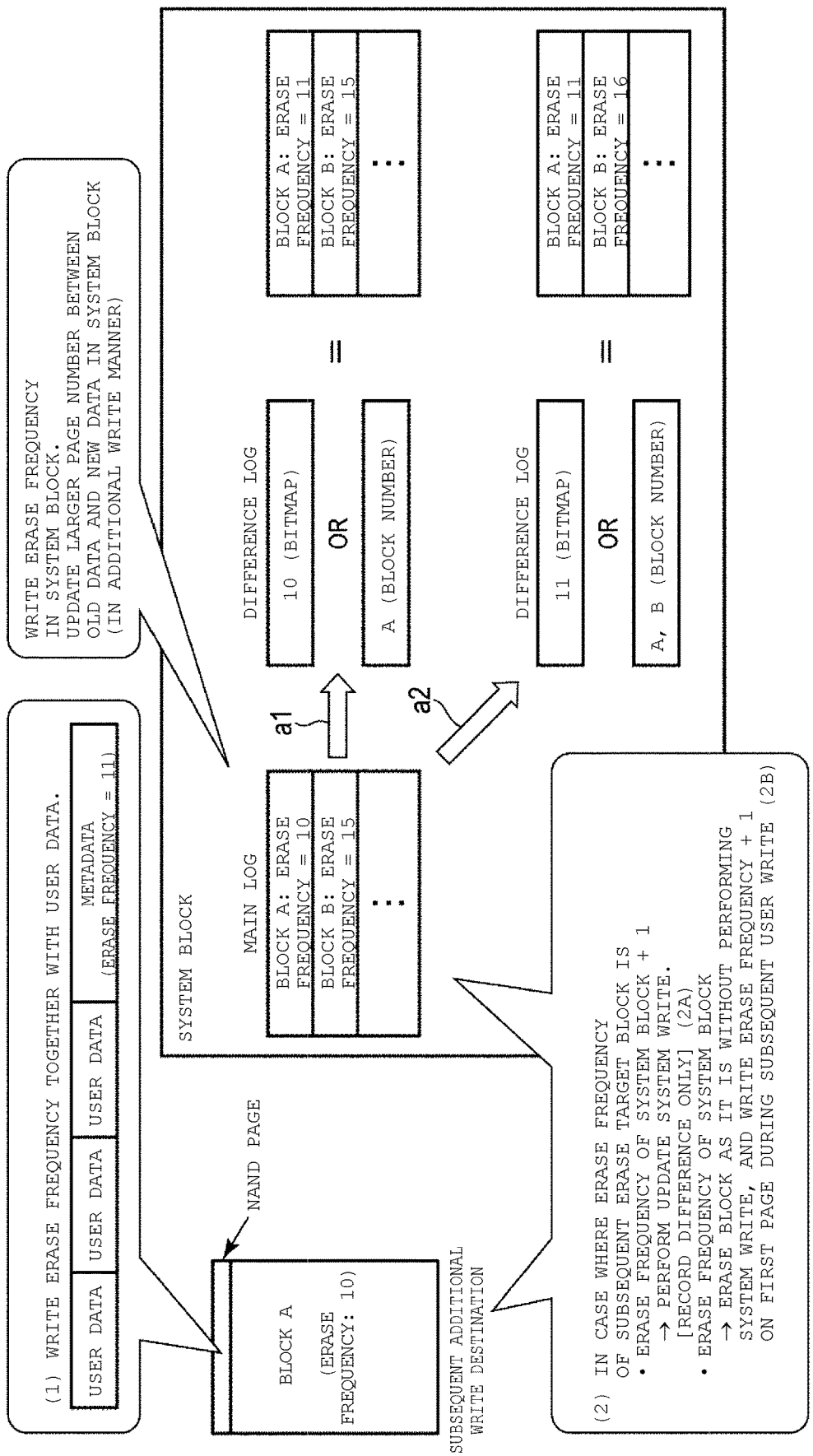
FIG. 12 is a diagram illustrating a method for managing an erase frequency and a method for restoring the erase frequency which are executed by the memory system according to the third embodiment.

In FIG. 12, an arrow of a reference numeral a1 indicates a case where only the block A is erased after the previous system write. In this case, the difference data generated by the difference generation unit 2142 and stored in the difference log is "10" (bitmap) or "A" (block number). In the bitmap, the first bit corresponds to the block A, and the second bit corresponds to the block B, respectively. In addition, "1" indicates that erasing is performed, and "0" indicates that erasing is not performed. Therefore, the bitmap "10" indicates that the block A is erased and the block B is not erased. As a result, 11 is stored as the erase frequency of the block A, and 15 is stored as the erase frequency of the block B in the main log and the difference log of the system block.

On the other hand, an arrow of a reference numeral a2 indicates a case where both the block A and the block B are erased after the previous system write. In this case, the difference data generated by the difference generation unit 2142 and stored in the difference log is "11" (bitmap) or "A, B" (block numbers). As a result, 11 is stored as the erase frequency of the block A, and 16 is stored as the erase frequency of the block B in the main log and difference log of the system block. Here, it is assumed that erasing the block B is reflected together in the difference log when the block A is erased as a trigger. Therefore, at this timing, the erase frequency stored in the first page of the block B and the erase frequency stored in the system block coincide with each other at 16. The erase frequency stored in the first page of the block A after erase is 17 which is one more than the erase frequency stored in the system block (main log+ difference log).

Thereafter, in any one of the NAND blocks 221, the difference log is additionally written each time the erase frequency of the first page after erase is a value greater by two than a value of the erase frequency of the system block. The system block management unit 214 may perform an operation of reflecting the accumulated difference logs in the main log at a predetermined timing.

In this way, the erase frequency recorded in the system block is converted into differential information. Accordingly, the memory system 2 of the third embodiment can reduce the data amount of the system write to be written in the system block.

An operation flow when the erase frequency is assigned in the memory system 2 of the third embodiment is the same as an operation flow in a case of the memory system 2 of the second embodiment (refer to FIG. 8).

Figure 13:
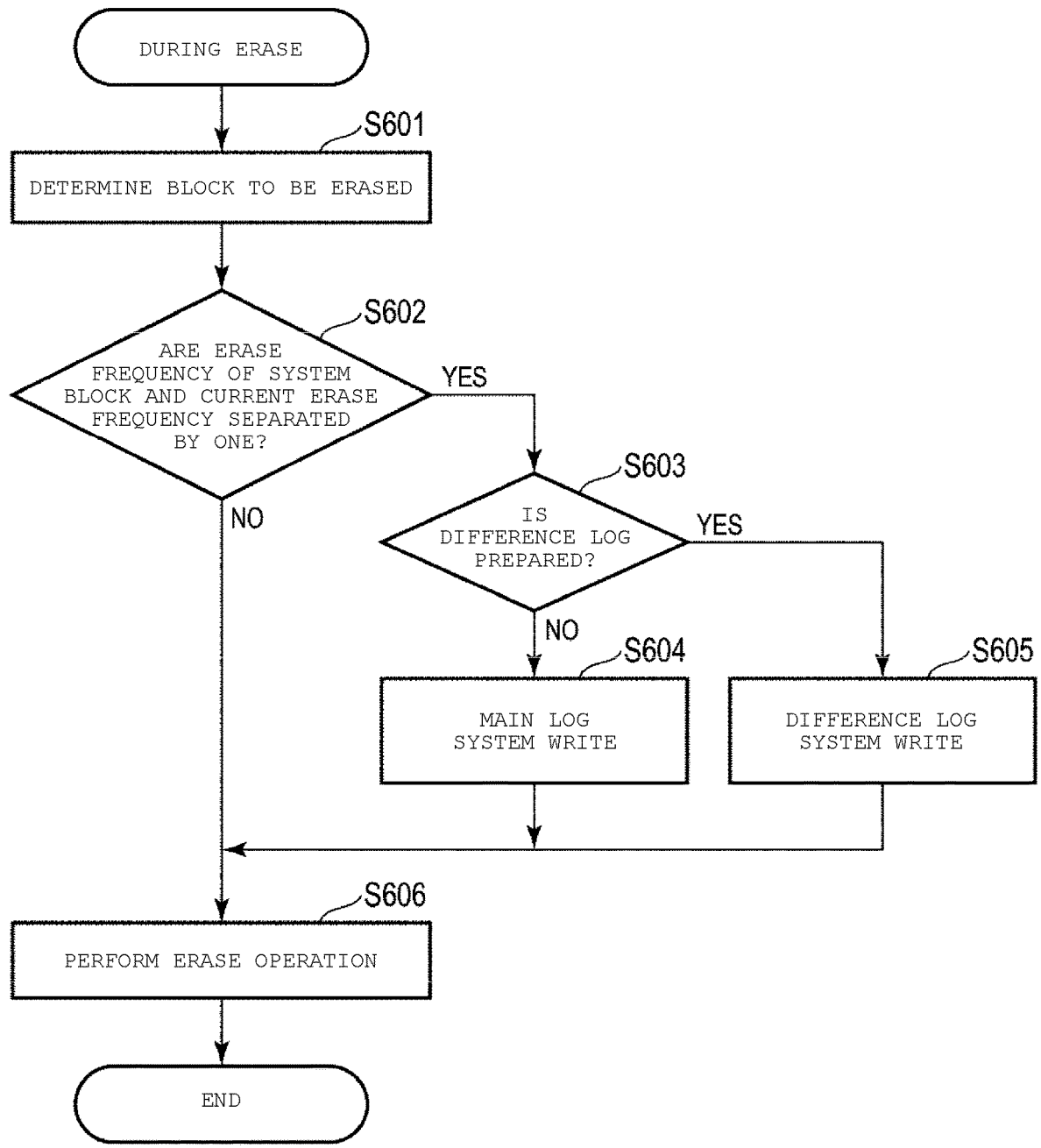
FIG. 13 is a flowchart showing an operation flow during erase in the memory system of the third embodiment.

FIG. 13 is a flowchart showing an operation flow during erase of the memory system 2 of the third embodiment.

The write destination management unit 2112 determines the next write destination, that is, the block to be erased (S601). The system data write determination unit 2141 determines whether the erase frequency of the system block and the current number of times of erasing in the determined block are separated by one (S602). When both the numbers of times of erasing are separated by one (S602: YES), the erase frequency management unit 2111 performs the system write via the system block management unit 214. At this time, when the system data write determination unit 2141 does not determine to prepare the difference log (S603: NO), as in the second embodiment, the system block management unit 214 performs the system write on the main log (S604). On the other hand, when the system data write determination unit 2141 determines to prepare the difference log (S603: YES), the system block management unit 214 prepares the difference data by using the difference generation unit 2142, and performs the system write on the difference log (S605). After the system write is completed by the system block management unit 214, the write destination determination unit 211 erases the block (S606).

For example, it is conceivable that criteria for determining whether the system data write determination unit 2141 prepares a difference log include the followings.
(1) Settings to always write a difference (determination to always prepare a difference log).
(2) The first page of the system block is a main log, and the subsequent pages are difference logs.
(3) Repetition so that the first page of the system block is the main log, the next page is the difference log at n-consecutive times, and the subsequent pages are the main log and the difference log at n-consecutive times.

On the other hand, when both the erase frequencies coincide with each other (S602: NO), S603 to S605 are skipped, and the write destination determination unit 211 erases the block (S606).

Figure 14:
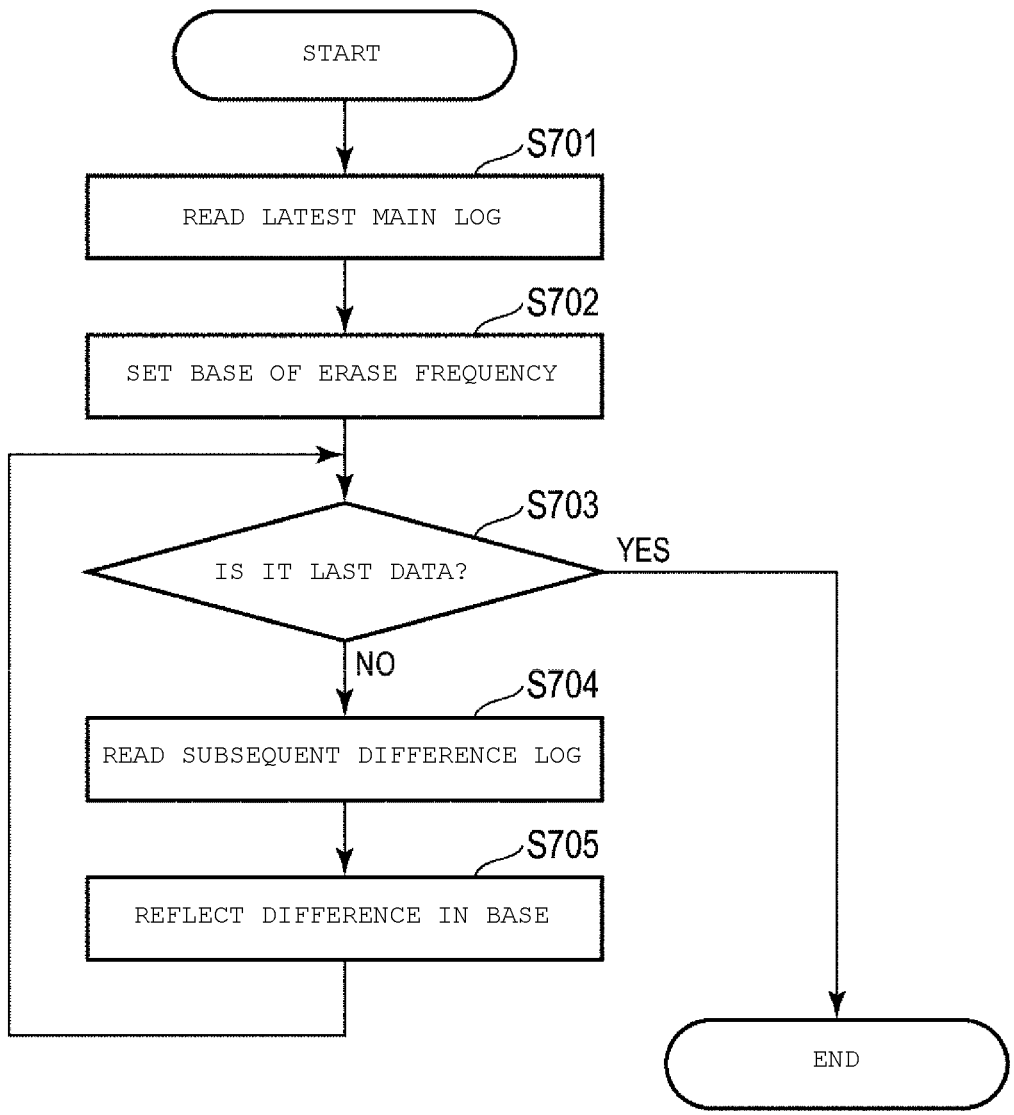
FIG. 14 is a flowchart showing a part of an operation flow when the erase frequency is restored in the memory system according to the third embodiment.

FIG. 14 is a flowchart showing a part of an operation flow when the erase frequency is restored in the memory system 2 of the third embodiment, and is a flowchart showing a part of an operation flow corresponding to S501 (refer to FIG. 10) of the memory system 2 of the second embodiment. The flow after S705 in FIG. 14 is the same as the flow after S502 of the memory system 2 of the second embodiment.

The erase frequency restoring unit 2121 reads the latest main log (S701). As a method of retrieving the latest main log, it is conceivable (1) to read the system logs in order of oldest ones and set the finally read main log as the latest main log, and (2) to read the system logs in order of newest ones and set the initially read main log as the latest main log. The erase frequency restoring unit 2121 sets a read value as a base of the erase frequency (S702). The erase frequency restoring unit 2121 determines whether the read main log is the last data (S703), and when the read main log is the last data (S703: YES), the process proceeds to S502 in FIG. 10. When the read main log is not the last data (S703: NO), the erase frequency restoring unit 2121 reads the subsequent difference log (S704), and reflects the read value in the base (number of times of erasing) (S705).

The erase frequency restoring unit 2121 determines whether the read difference log is the last data (S703). When the read difference log is not the last data (S703: NO), the erase frequency restoring unit 2121 reads the subsequent difference log (S704), and reflects the read value in the base (number of times of erasing) (S705). The erase frequency restoring unit 2121 repeats the processes in S704 and S705 up to the difference log of the last data. When the read difference log is the last data (S703: YES), the erase frequency restoring unit 2121 proceeds to S502 in FIG. 10.

As described above, the memory system 2 of the third embodiment can further reduce the data amount of the system write for writing the erase frequency of each block in the system block.

Fourth Embodiment

Next, a fourth embodiment will be described.

In the first to third embodiments, an example has been described in which the memory system 2 stores the erase frequency of each block as metadata in the first page of each block together with user data.

Incidentally, the NAND block 221 has a characteristic in that reliability during reuse deteriorates when erased in a state where the data is written up to an intermediate page, that is, in a state where the data is not written on some pages. Therefore, for example, when the memory system 2 is used as a volatile storage device, when the power of the memory system 2 is turned on, it is preferable to start write from the block applied as the data write destination when the power is previously turned off. Alternatively, it is preferable to take measures to prevent erasing in a state where writing data on all pages is incomplete, such as writing dummy data on pages in a state where the data is not written. Hereinafter, a block in which the data is written up to the intermediate page will be referred to as an "intermediately stopped block".

In order to take the measures in this way, when the power of the memory system 2 is turned on, it is necessary to specify the block (intermediately stopped block) applied as the data write destination when the power is previously turned off, from many blocks in the NAND memory 22. However, for example, when a data write condition of each block is recorded by the system write in the system block, response performance of the memory system 2 is degraded as in a case of the erase frequency described in the first to third embodiments.

Therefore, in the memory system 2 of the fourth embodiment, as in the erase frequency in the first to third embodiments, information for specifying the intermediately stopped block which is one block management information is stored as the metadata in the first page of each block together with the user data.

Figure 15:
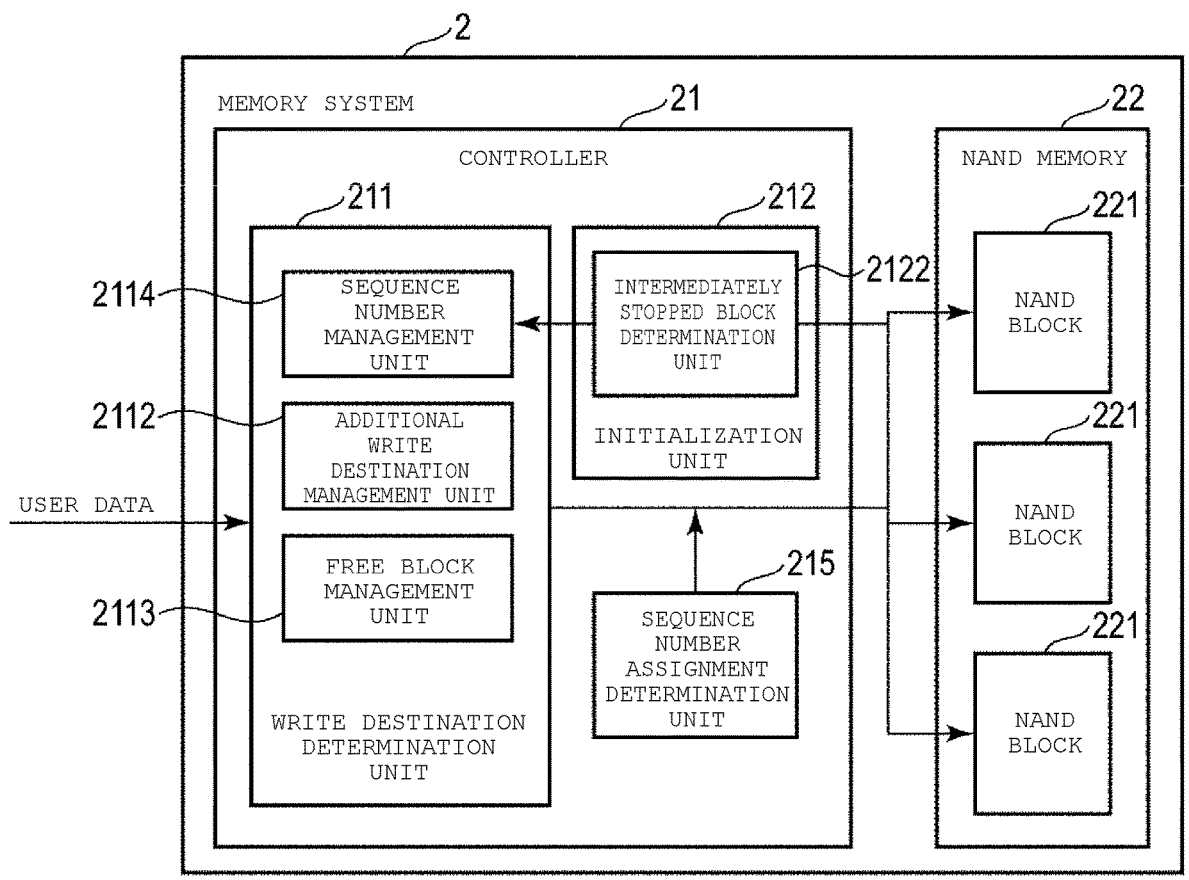
FIG. 15 is a diagram showing a configuration example of a memory system according to a fourth embodiment.

FIG. 15 is a diagram showing a configuration example of the memory system 2 of the fourth embodiment. Compared to the memory system 2 of the first embodiment (refer to FIG. 2), in the memory system 2 of the fourth embodiment, the erase frequency management unit 2111, the erase frequency restoring unit 2121, and the erase frequency assignment determination unit 213 are replaced with a sequence number management unit 2114, an intermediately stopped block determination unit 2122, and a sequence number assignment determination unit 215.

The sequence number management unit 2114 uses the first page of the NAND block 221 to manage a sequence number indicating a sequence applied as the data write destination for each NAND block 221. A method of the sequence number management unit 2114 for managing the sequence number will be described in detail later.

The intermediately stopped block determination unit 2122 determines the intermediately stopped block from the plurality of NAND blocks 221 in the NAND memory 22, based on the sequence number managed by the sequence number management unit 2114 by using the first page of the NAND block 221. A method of the intermediately stopped block determination unit 2122 for determining the intermediately stopped block will be described later.

The sequence number assignment determination unit 215 determines whether it is a timing for writing the sequence number in the NAND memory 22. As described above, in the memory system 2 of the first embodiment, the sequence number management unit 2114 uses the first page of the NAND block 221 to manage the sequence number for each NAND block 221. Although the method for managing the sequence number will be described later, specifically, the sequence number assignment determination unit 215 determines whether the write target page in the NAND block 221 is the first page.

Figure 16:
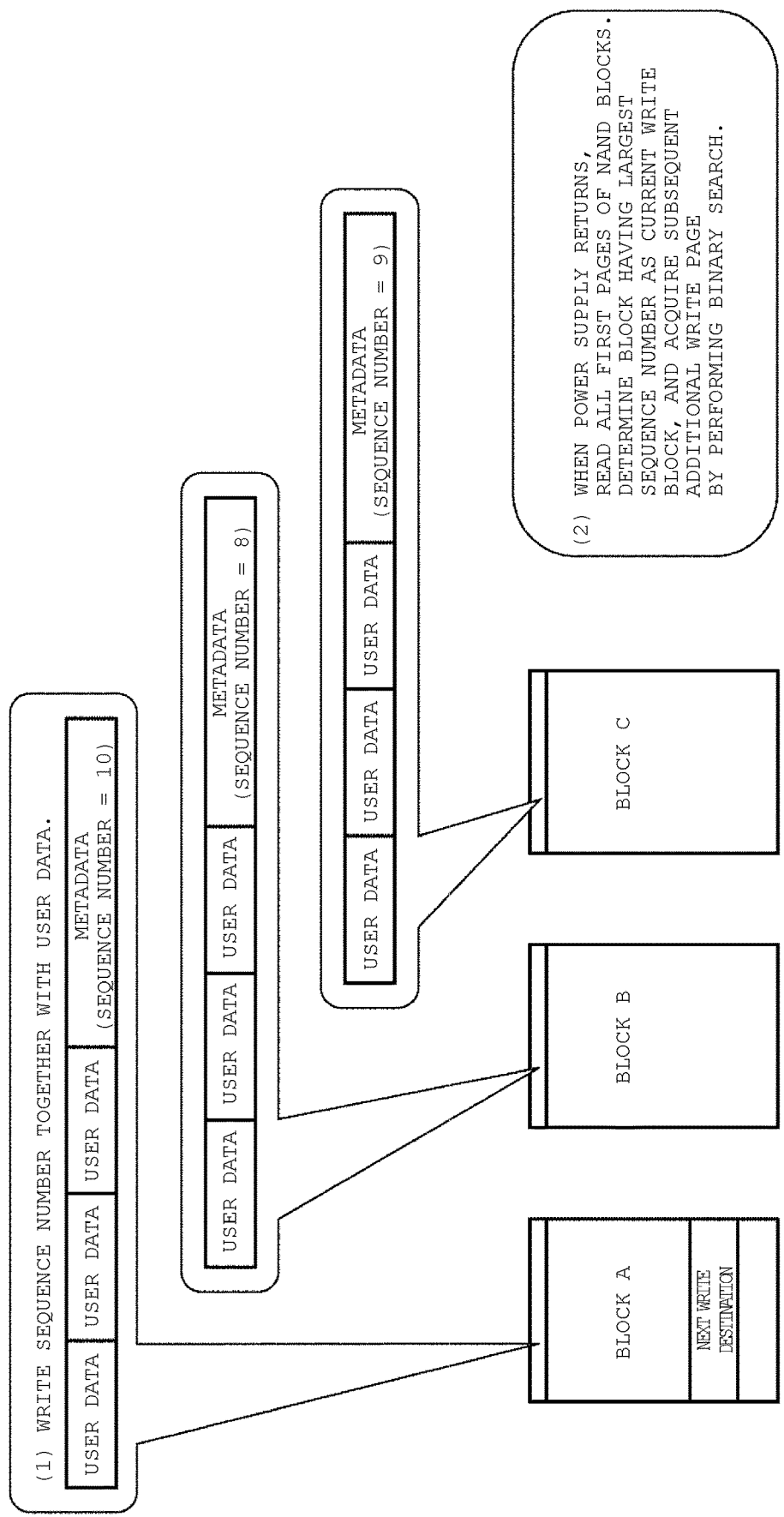
FIG. 16 is a diagram illustrating a method for managing a sequence number and a method for determining an intermediately stopped block which are executed by the memory system according to the fourth embodiment.

Here, referring to FIG. 16, the method for managing the sequence number and a method for determining the intermediately stopped block when the power is turned on which are executed in the memory system 2 of the fourth embodiment configured as above will be described.

Here, it is assumed that the block B, the block C, and the block A are applied in the order as the user data write destination blocks. For example, the following case is conceivable. The block C is applied as the write destination block, but writing reaches the last page. The memory system 2 is present under a condition that the write destination management unit 2112 selects the block A as the subsequent write destination. When writing in block A starts, the sequence number assignment determination unit 215 detects that the write target page is the first page. In this case, for example, the sequence number management unit 2114 writes the sequence number managed as a serial number after the memory system 2 starts to be used, on the first page of the block A as the metadata together with the user data (1). Thereafter, the sequence number management unit 2114 increments the sequence number which is the above-described serial number, by one. Hereinafter, the sequence number managed by the sequence number management unit 2114 which is the above-described serial number may be referred to as a global sequence number.

That is, as described above, when the block B, the block C, and the block A are applied in the order as the user data write destination blocks, the sequence number having a value obtained by adding one to the sequence number stored as the metadata in the first page of the block B is stored in the first page of the block C as the metadata together with the user data. Furthermore, the sequence number having a value obtained by adding one to the sequence number stored as the metadata in the first page of the block C is stored in the first page of the block A as the metadata together with the user data. A portion written as the "next write destination" in the block A in FIG. 16 indicates a page on which the data is to be subsequently written.

In this way, the memory system 2 of the fourth embodiment stores the sequence number managed as the global sequence number in the first page of the NAND block 221 as the metadata together with the user data, each time a certain NAND block 221 is applied as the data write destination, and increments the global sequence number. In this manner, the memory system 2 manages the sequence number without performing the system write on the system block, for example. A timing for incrementing the global sequence number may be before the sequence number is stored in the first page of the NAND block 221.

Next, a method for determining the intermediately stopped block (block A) when the power supply returns will be described assuming a case where the power of the memory system 2 is turned off and thereafter the power of the memory system 2 is turned on under a condition that the data is intermediately written in the block A.

When the power supply of the memory system 2 returns, the intermediately stopped block determination unit 2122 reads the first pages of all NAND blocks 221 of the NAND memory 22. The intermediately stopped block determination unit 2122 determines that the NAND block 221 having the largest sequence number in all NAND blocks 221 stored as the metadata in the first page is the intermediately stopped block. In addition, the sequence number management unit 2114 manages a value obtained by adding one to the sequence number stored in the first page of the intermediately stopped block as the global sequence number.

In this way, the memory system 2 of the fourth embodiment can determine the intermediately stopped block without performing system write on the system block, for example. Since the intermediately stopped block is determined, the memory system 2 can prevent a possibility that the intermediately stopped block may be erased while including a page in an unwritten state, such as a possibility that the user data write may start from the "next write destination" page in the intermediately stopped block, or a possibility that the dummy data is written from the "next write destination" page to the last page.

Figure 17:
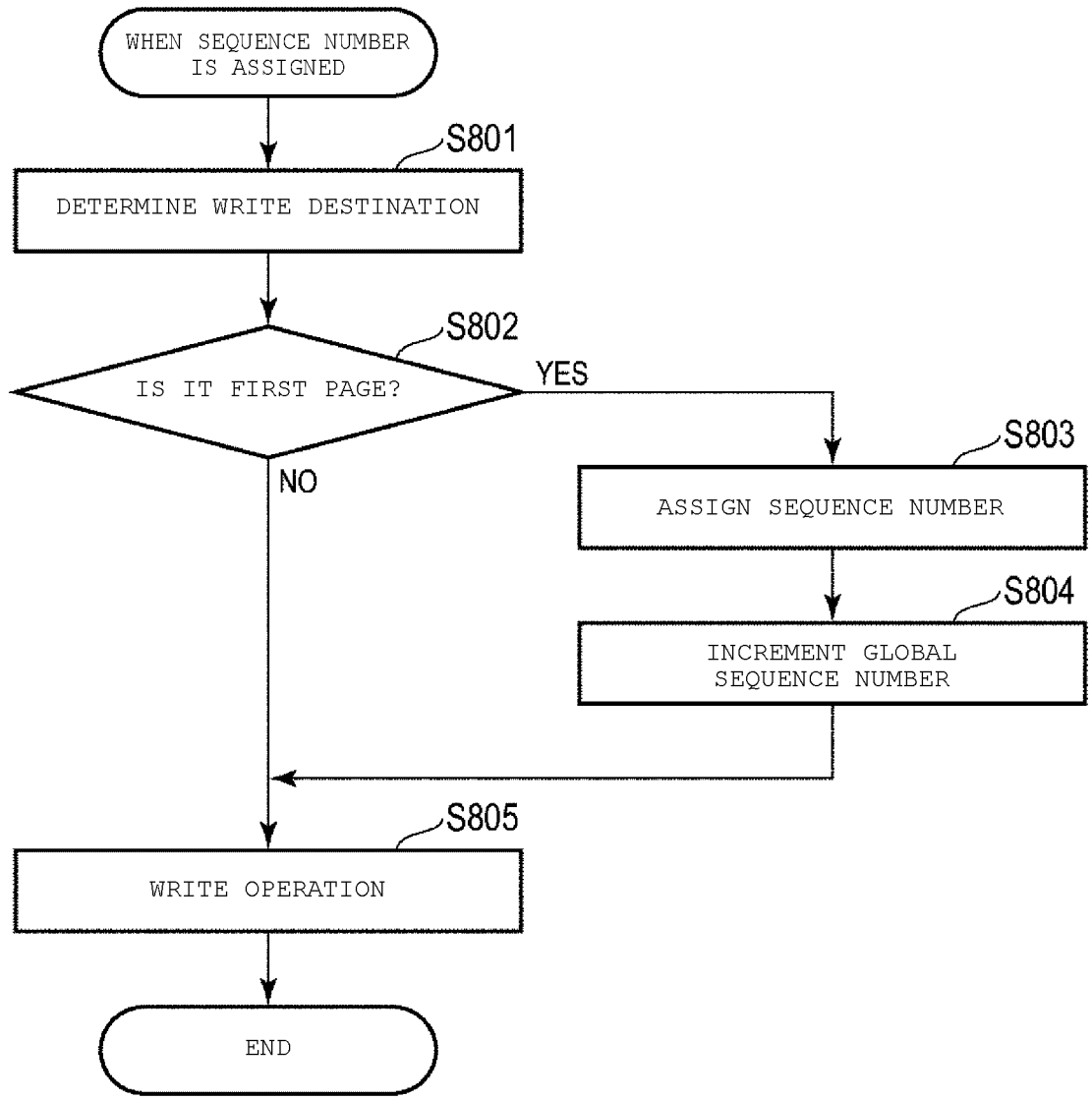
FIG. 17 is a flowchart showing an operation flow when the sequence number is assigned in the memory system according to the fourth embodiment.

FIG. 17 is a flowchart showing an operation flow when the sequence number is assigned in the memory system 2 of the fourth embodiment.

The sequence number assignment determination unit 215 determines which page in the NAND block 221 serving as the write destination is the write destination page (S801). When it is determined that the write destination page is the first page (S802: YES), the sequence number assignment determination unit 215 assigns the sequence number managed as the global sequence number at that time point to the write data (S803). Next, the sequence number assignment determination unit 215 increments the global sequence number by one (S804). The write destination determination unit 211 performs a write operation on the first page (S805).

On the other hand, when it is determined that the write destination page is the page other than the first page (S802: NO), the write destination determination unit 211 performs a write operation on the page other than the first page of the user data to which the sequence number is not assigned (S805).

Figure 18:
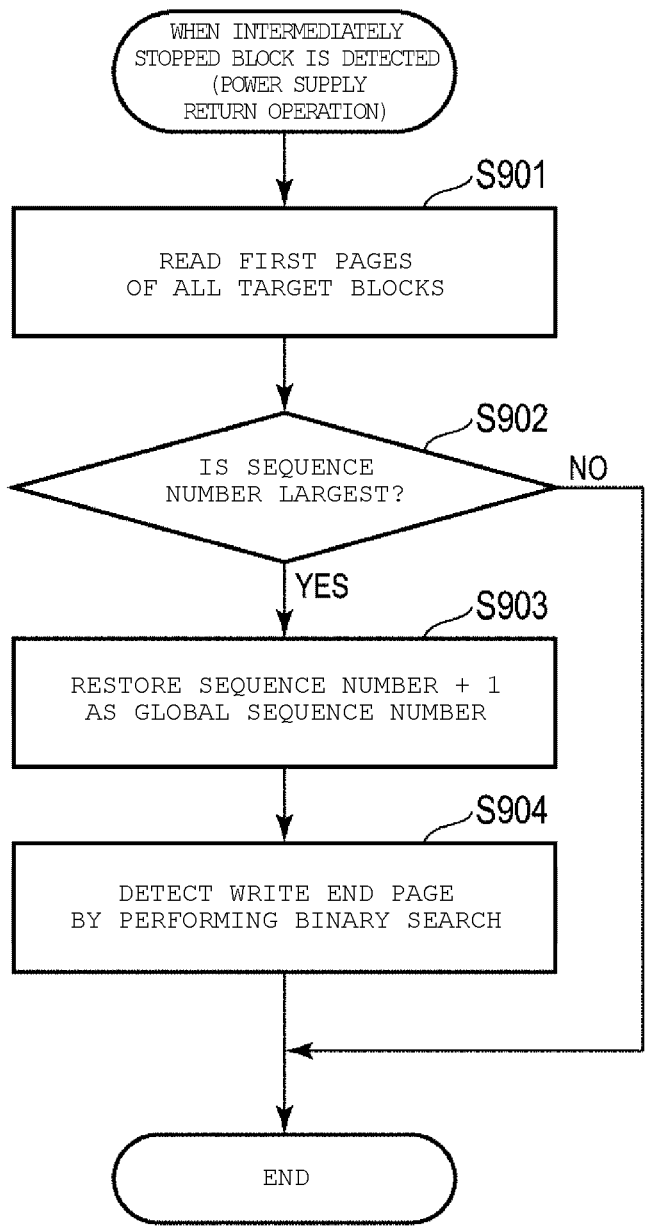
FIG. 18 is a flowchart showing an operation flow when an intermediately stopped block is detected in the memory system according to the fourth embodiment.

FIG. 18 is a flowchart showing an operation flow when the intermediately stopped block is detected in the memory system 2 according to the fourth embodiment.

The intermediately stopped block determination unit 2122 first reads the first page of all target blocks (S901). The intermediately stopped block determination unit 2122 retrieves the block having the largest sequence number written on the first page from all target blocks (S902). When the intermediately stopped block determination unit 2122 finds the block having the largest sequence number (S902: YES), the intermediately stopped block determination unit 2122 determines the block as the intermediately stopped block. The sequence number management unit 2114 restores a value obtained by adding one to the sequence number written on the first page of the intermediately stopped block as the global sequence number (S903). In addition, the intermediately stopped block determination unit 2122 detects the finally written page in the block determined as the intermediately stopped block by performing a binary search (S904). As described above, when a written end page is detected, writing may start from a page subsequent to the written end page, or dummy data may be written on all pages subsequent to the written end page.

As described above, the memory system 2 of the fourth embodiment can reduce a load of managing information (for example, the sequence number) required for determining the intermediately stopped block which is one block management information.

Fifth Embodiment

Next, a fifth embodiment will be described.

The memory system 2 of the fourth embodiment is adopted on a premise that only one NAND block 221 applied as the user data write destination exists in the NAND memory 22. That is, the memory system 2 of the fourth embodiment is adopted on a premise that there is only one intermediately stopped block to be detected when the power supply of the memory system 2 returns.

On the other hand, for example, the NAND block 221 in the NAND memory 22 may be allocated for each user or each program so that access requests from a plurality of users or a plurality of programs may be accepted in parallel. In this case, the NAND block 221 applied as the user data write destination may exist for each user or each program. Therefore, the number of the intermediately stopped blocks to be detected when the power of the memory system 2 returns is not limited to one. Therefore, a configuration is adopted so that the memory system 2 of the fifth embodiment can more efficiently detect a plurality of intermediately stopped blocks.

Figure 19:
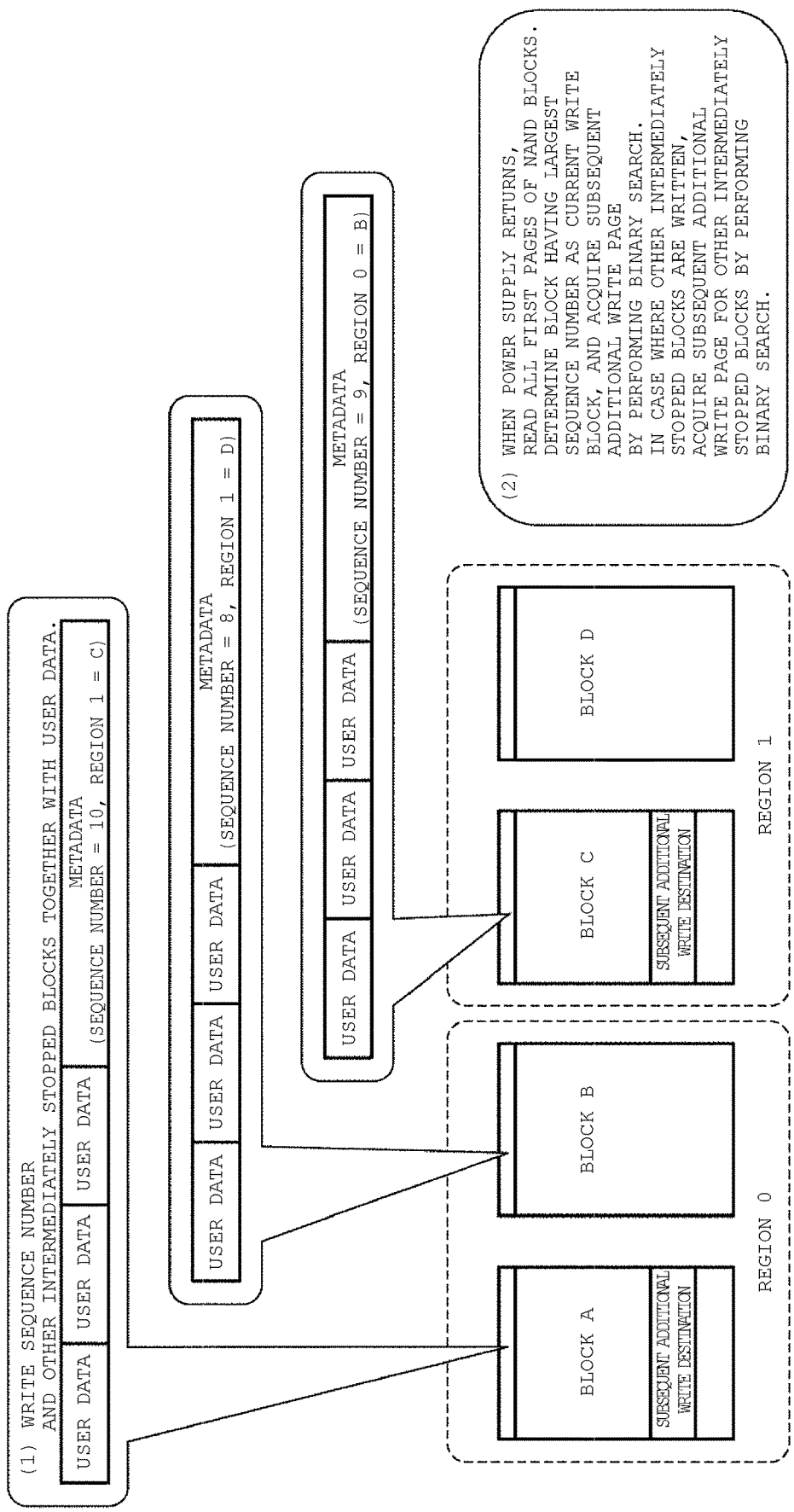
FIG. 19 is a diagram illustrating a method for managing a sequence number and a method for determining an intermediately stopped block which are executed by a memory system according to a fifth embodiment.

Referring to FIG. 19, a method for managing the sequence number and a method for determining the intermediately stopped block when the power is turned on which are executed in the memory system 2 of the fifth embodiment will be described.

In FIG. 19, a "region" is an aggregate (group) of the NAND blocks 221 allocated to each user or each program, for example. Here, first, the following case is assumed. The block B is applied as the write destination block of data requested to be written by a certain user or program (region 0), and a block D is applied as the write destination block of data requested to be written by another user or program (region 1). In addition, it is also assumed that the block B is applied as the write destination block after the block D is applied as the write destination block. That is, at this time point, the largest sequence number is assigned to the block B (sequence number: 8). Therefore, the global sequence number is a value obtained by adding one to the sequence number assigned to the block B (global sequence number: 9).

Next, it is assumed that the data is written up to the last page in the block D, and the block C is selected and applied as the subsequent write destination block in the region 1. As described in the fourth embodiment, in this case, the sequence number management unit 2114 stores the global sequence number at that time point in the first page of the block C as the metadata together with the user data (sequence number=9). In addition to this configuration, in the fifth embodiment, the sequence number management unit 2114 further stores an identifier of the block (here, the block B) applied as the write destination block other than the block C as the metadata. (region 0=B). For example, the identifier is a block number uniquely allocated to each block.

Furthermore, next, it is assumed that the data is written up to the last page in the block B, and the block A is selected and applied as the subsequent write destination block in the region 0. In this case, the sequence number management unit 2114 stores the global sequence number at that time point in the first page of the block A as the metadata together with the user data (sequence number=10), and stores the identifier of the block (here, the block C) applied as the write destination block other than the block A as the metadata together with the user data (region 1=C).

That is, in the fifth embodiment, the sequence number and the identifier of the intermediately stopped block other than the block are written in the first page of each block as the metadata together with the user data (1). When a certain block is selected and applied as the write destination block, when other intermediately stopped blocks do not exist, the identifier as the metadata is not written on the first page. On the other hand, when two or more other intermediately stopped blocks exist, all of the identifiers of the blocks are written.

Next, a method for determining the intermediately stopped blocks (blocks A and C) when the power returns in a state where the block A and the block C are intermediately stopped blocks will be described.

As in the fourth embodiment, the intermediately stopped block determination unit 2122 reads the first pages of all NAND blocks 221 of the NAND memory 22. The intermediately stopped block determination unit 2122 first determines that the NAND block 221 having the largest sequence number in all NAND blocks 221 stored as the metadata in the first page is the intermediately stopped block. Here, first, the block A is detected as the intermediately stopped block.

Subsequently, the intermediately stopped block determination unit 2122 uses the identifier (region 1=C) stored as the metadata in the first page of the block A to further detect the intermediately stopped block. That is, subsequently to the block A, the block C is detected as the intermediately stopped block by using a one-after-another system.

In this way, in the fifth embodiment, when the power supply returns, the plurality of intermediately stopped blocks are detected, based on the sequence number stored in the first page of each NAND block 221 and the identifiers other than the block (2).

Figure 20:
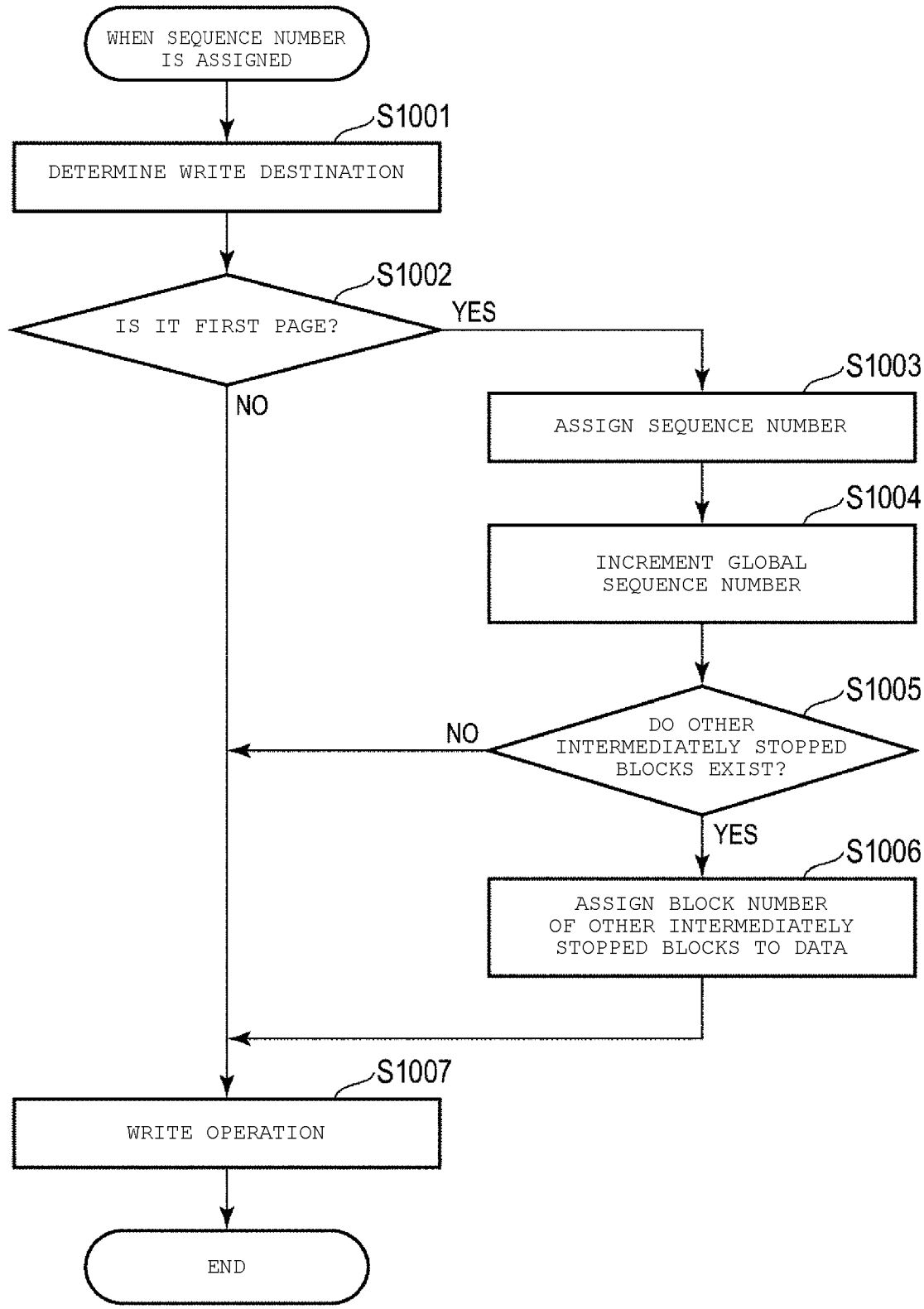
FIG. 20 is a flowchart showing an operation flow when the sequence number is assigned in the memory system according to the fifth embodiment.

FIG. 20 is a flowchart showing an operation flow when the sequence number is assigned in the memory system 2 of the fifth embodiment.

The sequence number assignment determination unit 215 determines which page in the NAND block 221 serving as the write destination is the write destination page (S1001). When it is determined that the write destination page is the first page (S1002: YES), the sequence number assignment determination unit 215 assigns the sequence number managed as the global sequence number at that time point to the write data (S1003). Next, the sequence number assignment determination unit 215 increments the global sequence number by one (S1004).

In addition, the sequence number assignment determination unit 215 determines whether other NAND blocks 221 exist as the intermediately stopped block (S1005). When other NAND blocks 221 exist (S1005: YES), the sequence number assignment determination unit 215 further assigns the identifier of the block (block number) to the write data (S1006). The write destination determination unit 211 performs a write operation on the first page (S1007).

When other NAND blocks 221 which are the intermediately stopped blocks do not exist (S1005: NO), the write destination determination unit 211 skips the process in S1006, and performs a write operation on to the first page of the user data to which only the sequence number is assigned (S1007). When it is determined that the write destination page is the page other than the first page (S1002: NO), the write destination determination unit 211 performs a write operation on the page other than the first page of the user data to which the sequence number and the identifier of the intermediately stopped block are not assigned (S1007).

Figure 21:
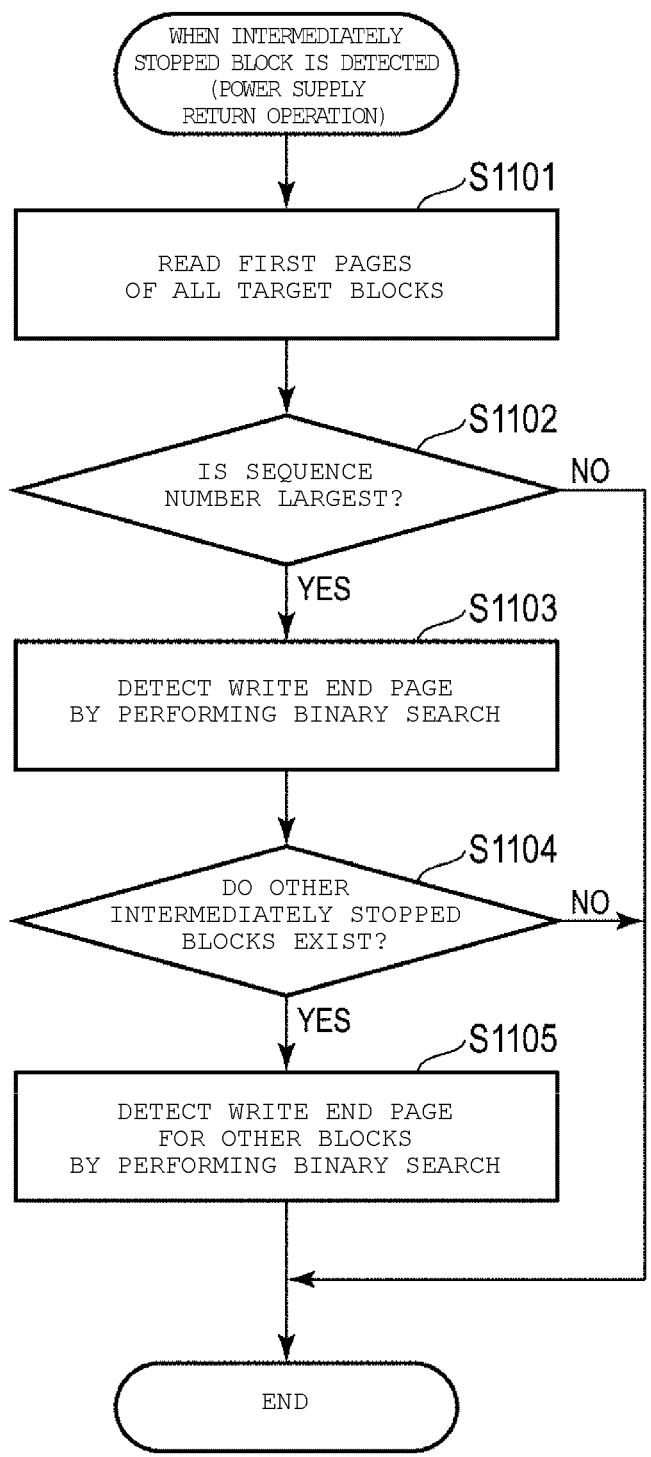
FIG. 21 is a flowchart showing an operation flow when the intermediately stopped block is detected in the memory system according to the fifth embodiment.

FIG. 21 is a flowchart showing an operation flow when the intermediately stopped block is detected in the memory system 2 according to the fifth embodiment.

The intermediately stopped block determination unit 2122 first reads the first pages of all target blocks (S1101). The intermediately stopped block determination unit 2122 retrieves the block having the largest sequence number written on the first page from all target blocks (S1102). When the block having the largest sequence number is found (S1102: YES), the intermediately stopped block determination unit 2122 determines the block as the intermediately stopped block, and detects the finally written page in the block by performing a binary search (S1103).

Subsequently, the intermediately stopped block determination unit 2122 determines whether other intermediately stopped blocks exist, based on whether the identifier indicating other intermediately stopped blocks is stored in the first page of the block determined as the intermediately stopped block (S1104). When other intermediately stopped blocks exist (S1104: YES), the intermediately stopped block determination unit 2122 determines the block as the intermediately stopped block, and detects the finally written page in all of other intermediately stopped blocks by performing a binary search (S1105).

As described above, the memory system 2 of the fifth embodiment can not only reduce a load of managing information (for example, the sequence number) required for determining the intermediately stopped block which is one block management information, but also can efficiently detect the plurality of intermediately stopped blocks.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a non-volatile memory including a plurality of blocks, each block including a plurality of pages;
a controller configured to sequentially write data to the plurality of pages when data is written on the plurality of pages,
wherein the controller is configured to store management information relating to the plurality of blocks on a first page of each of the plurality of blocks;
wherein the management information includes a data erase frequency performed in each block to shift a state of each page from a data written state to a data unwritten state;
wherein, the controller is configured to:
when a second block is selected as a subsequent user data write destination under a condition that a first block is applied as a user data write destination, store a data erase frequency stored in the first page of the first block, in a second page of the second block, and after the data erase frequency is completely recorded in the second page of the second block, erase data of the first block.

2. The memory system according to claim 1, wherein the controller is configured to store the management information on the first page together with user data.

3. The memory system according to claim 1, wherein the controller is configured to:
when power supply returns after the power supply is improperly cut off, read the first page for all of the plurality of blocks,
and when there exists a third block from which the first page can not be read,
read the second page for all of the plurality of blocks excluding the third block,
retrieve a data erase frequency of the third block, and
record a value obtained by adding one to the retrieved data erase frequency in the first page of the third block, as the data erase frequency of the third block.

4. The memory system according to claim 3, wherein the controller is configured to, when the data erase frequency of the third block is retrieved from the second pages of two or more blocks in the plurality of blocks excluding the third block, adopt a data erase frequency having a greatest value from retrieved results.

5. The memory system according to claim 1, wherein the non-volatile memory is a memory in which data cannot be overwritten in a data written page.

6. A memory system comprising:
a non-volatile memory including a plurality of blocks, each block including a plurality of pages;
a controller configured to sequentially write data to the plurality of pages when data is written on the plurality of pages,
wherein the controller is configured to store management information relating to the plurality of blocks on a first page of each of the plurality of blocks;
wherein the management information includes a data erase frequency performed in each block to shift a state of each page from a data written state to a data unwritten state;
wherein the controller is configured to secure one block from the plurality of blocks as a system block for recording a data erase frequency performed in each block, and manage whether the data erase frequency recorded in the first page in each block is equal to (i) the data erase frequency recorded in the system block, or (ii) the value obtained by adding one to the data erase frequency recorded in the system block,
the controller is configured to, when a fourth block is selected as a subsequent user data write destination, determine whether the data erase frequency recorded in the first page of the fourth block is equal to (i) the data erase frequency recorded in the system block, or (ii) a value obtained by adding one to the data erase frequency recorded in the system block,
the controller is configured to, when the data erase frequency recorded in the first page of the fourth block is equal to the data erase frequency recorded in the system block, erase data of the fourth block without recording the data erase frequency in the system block, and thereafter, record a value obtained by adding one to the data erase frequency recorded in the first page of the fourth block as the data erase frequency, and the controller is configured to, when the data erase frequency recorded in the first page of the fourth block is the value obtained by adding one to the data erase frequency recorded in the system block, record the value obtained by adding one to the data erase frequency recorded in the first page of the fourth block, as the data erase frequency, erase the data of the fourth block, and thereafter, record the value obtained by adding one to the data erase frequency recorded in the first page of the fourth block as the data erase frequency.

7. The memory system according to claim 6, wherein the controller is configured to, when a data erase frequency of the fourth block is recorded in the system block, and when there exists a fifth block in which the data erase frequency recorded in the first page is the value obtained by adding one to the data erase frequency recorded in the system block, concurrently record the data erase frequency recorded in the first page of the fifth block in the system block.

8. The memory system according to claim 6, wherein the controller is configured to, when power supply returns after the power supply is improperly cut off, read the first page for all of the plurality of blocks excluding the system block.

9. The memory system according to claim 8, wherein: the controller is configured to, when there exists a sixth block from which the first page can not be read, read a data erase frequency of the sixth block from the system block, and record a value obtained by adding one to the data erase frequency read from the system block in the first page of the sixth block as the data erase frequency of the sixth block.

10. The memory system according to claim 6, wherein the controller is configured to additionally write and record a data erase frequency of each block in the system block from a page having a smaller page number to a page having a greater page number, and when a plurality of data erase frequencies are recorded in the system block for the same block, adopt the data erase frequency recorded in the page having the greatest page number from the plurality of data erase frequencies.

11. The memory system according to claim 6, wherein the controller is configured to record a data erase frequency in the system block by additionally writing a difference from when the data erase frequency is previously written in the system block.

12. The memory system according to claim 6, wherein: the controller is configured to store the management information on the first page together with user data.

13. The memory system according to claim 6, wherein: the non-volatile memory is a memory in which data cannot be overwritten in a data written page.

14. A memory system comprising:
a non-volatile memory including a plurality of blocks, each block including a plurality of pages;
a controller configured to sequentially write data to the plurality of pages when data is written on the plurality of pages,
wherein the controller is configured to store management information relating to the plurality of blocks on a first page of each of the plurality of blocks;
wherein the controller is configured to record a sequence number indicating a sequence applied as user data write destination in the first page of each block, as the management information;
wherein the plurality of blocks are allocated to one of a plurality of groups each including a block applied as the user data write destination, and
the controller is configured to, when an eighth block is allocated and applied to a first group as the user data write destination, record (i) an identifier of the block applied as the user data write destination in the groups other than the first group in the first page of the eighth block together with (ii) the sequence number as the management information.

15. The memory system according to claim 14, wherein the controller is configured to, when power supply starts, read the first page for all of the plurality of blocks, and retrieve a seventh block in which the sequence number having a greatest value is recorded, as a block applied as the user data write destination when the power supply is previously cut off.

16. The memory system according to claim 14, wherein the controller is configured to, when power supply starts,
read the first page for all of the plurality of blocks,
retrieve a ninth block in which the sequence number having a greatest value is recorded, as the block applied as the user data write destination when the power supply is previously cut off, and
determine one or more tenth blocks indicated by the identifier recorded together with the sequence number in the first page of the ninth block, as the block applied as the user data write destination when the power supply is previously cut off.

17. The memory system according to claim 14, wherein: the controller is configured to store the management information on the first page together with user data.

18. The memory system according to claim 14, wherein: the non-volatile memory is a memory in which data cannot be overwritten in a data written page.

* * * * *